(12) United States Patent
Pervaiz et al.

(10) Patent No.: US 11,575,314 B2
(45) Date of Patent: Feb. 7, 2023

(54) AUTONOMOUS MODE TRANSITION FOR MULTIMODE OPERATION IN BOOST PFC CONVERTERS

(71) Applicant: Texas Instruments Incorporated, Dallas, TX (US)

(72) Inventors: Saad Pervaiz, Dallas, TX (US); Sombuddha Chakraborty, Redwood City, CA (US); Philomena Brady, Farmers Branch, TX (US); Laszlo Balogh, Merrimack, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 85 days.

(21) Appl. No.: 17/334,651

(22) Filed: May 28, 2021

(65) Prior Publication Data

US 2022/0393574 A1 Dec. 8, 2022

(51) Int. Cl.
*H02M 1/42* (2007.01)
*H02M 3/335* (2006.01)
(Continued)

(52) U.S. Cl.
CPC ....... *H02M 1/4225* (2013.01); *H02M 1/0095* (2021.05); *H02M 1/083* (2013.01); *H02M 3/33592* (2013.01)

(58) Field of Classification Search
CPC ............. H02M 1/4225; H02M 1/0095; H02M 1/083; H02M 3/33592
See application file for complete search history.

(56) References Cited

U.S. PATENT DOCUMENTS 8,125,805 B1 * 2/2012 Melanson ........... H02M 1/4225
363/41
8,130,522 B2 * 3/2012 Maksimovic ....... H02M 3/1584
323/283

(Continued)

OTHER PUBLICATIONS

Xuechao, L. and Zhihao, W., "UCC28070 Implement Bridgeless Power Factor Correction (PFC) Pre-Regulator Design," Texas Instruments, Application Report, Jul. 2009, 13 pages.

(Continued)

*Primary Examiner* — Adolf D Berhane
(74) *Attorney, Agent, or Firm* — Ray A. King; Frank D. Cimino

(57) ABSTRACT

A controller for a boost power factor correction (PFC) converter. The controller is configured to operate the boost PFC converter in multiple operating modes, including a continuous conduction mode (CCM), a transition mode (TM), and a hybrid mode in which the controller operates the converter in both CCM and TM within a same line cycle. An example controller includes a current control loop and a mode transition circuit. The current control loop is configured to compute an inductor current for each of first and second operation modes, based on a current sample taken, for example, during a boost synchronous rectifier conduction period of the converter. The mode transition circuit includes digital logic circuitry and is configured to generate a pulse indicating that one, two or all three of: zero-voltage switching (ZVS) has been achieved; the synchronous rectifier conduction period is active; and/or one of TM or hybrid mode is active.

25 Claims, 19 Drawing Sheets

(51) Int. Cl.
*H02M 1/08* (2006.01)
*H02M 1/00* (2006.01)

(56) References Cited

U.S. PATENT DOCUMENTS

| | | | | |
|---|---|---|---|---|
| 8,797,004 | B2* | 8/2014 | Skinner | H02M 1/4225 363/90 |
| 9,178,444 | B2* | 11/2015 | Maru | H05B 45/10 |
| 10,536,068 | B2* | 1/2020 | Anwar | H02M 1/08 |
| 11,211,872 | B1* | 12/2021 | Jang | H02M 1/4225 |

OTHER PUBLICATIONS

Chellappan, S., "A comparative analysis of topologies for a bridgeless-boost PFC circuit," Analog Design Journal, 3Q, 2018, 5 pages.

Huang, Q. and Huang, A.Q., "Review of GaN Totem-Pole Bridgeless PFC," CPSS Transactions On Power Electronics and Applications, vol. 2, No. 3, Sep. 2017, pp. 187-196.

McDonald, B. and Lough, B., "Power Factor Correction (PFC) Circuit Basics," downloaded from Internet at URL: https://training.ti.com/sites/default/files/docs/power_factor_correction_circuit_basics_-_paper.pdf, on Feb. 4, 2021, 22 pages.

On Semiconductor, "NCP1618: High-Voltage, Multimode Power Factor Controller," Feb. 10, 2021, 1 page.

On Semiconductor, "High-Voltage, Multimode Power Factor Controller," NCP1618, Jun. 2020, 27 pages.

On Semiconductor, "NCP1655: Multi-Mode Power Factor Correction Controller," Feb. 10, 2021, 1 page.

On Semiconductor, "Power Factor Controller for Compact and Robust Multimode Pre-Converters," NCP1655, Nov. 2020, 23 pages.

On Semiconductor, "Power Factor Correction (PFC) Handbook, Choosing the Right Power Factor Controller Solution," rev. 5, Apr. 2014, 130 pages.

Texas Instruments, "Two-Phase Interleaved PFC Converter w/ Power Metering Test Results," TIDU249—Apr. 2014, 28 pages.

Texas Instruments, "PMP20873—1kW Totem-Pole PFC EVM Test Report," Oct. 2016, 16 page.

Texas Instruments, "98.6% Efficiency, 6.6-kW Totem-Pole PFC Reference Design for HEV/EV Onboard Charger," TIDUE54B, Mar. 2018, Revised Apr. 2020, 71 pages.

Texas Instruments, "High efficiency GaN CCM totem pole bridgeless Power Factor Correction (PFC) reference design", TIDM-1007, downloaded from Internet at URL: https://www.ti.com/tool/TIDM-1007, on May 10, 2021, 5 pages.

\* cited by examiner

AUTONOMOUS MODE TRANSITION FOR MULTIMODE OPERATION IN BOOST PFC CONVERTERS

FIELD OF THE DISCLOSURE

This disclosure relates to boost power factor correction (PFC) converters, and more particularly, to techniques for autonomous mode transition for multimode operation in boost PFC converters.

BACKGROUND

In the context of AC-to-DC power converters, power factor refers to the ratio of real power to apparent power. The real power is the power consumed by the load, and the apparent power is the product of the rms voltage and rms current of the converter while delivering that real power to the load. Power factor is a dimensionless value, between 0 and 1, with 1 being the best power factor (no circulating power). For an AC-to-DC converter, the AC input current does not naturally follow the AC input voltage, resulting in low power factor. Thus, in such converters, power factor correction (PFC) is used to maintain a relatively high power factor (compared to no PFC). A high PFC not only reduces circulating power (and increases efficiency), but also facilitates compliance with various regulations on AC-to-DC converters operating off a utility grid. An example such converter is referred to as a boost PFC converter. In operation, a boost PFC converter "boosts" (steps-up) the input voltage to some higher level by storing energy in an inductor and releasing it to a load at the higher voltage. Boost PFC converters can be bridged or bridgeless.

A bridged boost PFC converter topology includes a bridge rectifier (e.g., either passive or active) between the AC input source and the boost converter. A bridgeless PFC converter avoids the use of a separate bridge rectifier at the input, as the rectification is incorporated into the operation of the converter itself. This reduces power losses that normally occur in a full-bridge rectifier and, as a result, increases overall system efficiency. In both bridged and bridgeless topologies, the switching of the boost PFC converter is controlled such that shape of the input current mimics that of the input voltage, and can be accomplished both with hard-switching or soft-switching. Hard-switching refers to the actual switching of a given switching device (e.g., silicon metal oxide semiconductor field effect transistor, or MOSFET), and tends to cause power loss during on-off transitions of the switch and generates switching noise. In contrast, soft-switching uses an inductive-capacitive (LC) resonant circuit present within the converter to turn a given switch on and off at zero (or nearly zero) current or voltage. In this manner, soft-switching can be used to reduce switching loss and noise. However, soft-switching is not available in all operation modes.

In more detail, existing PFC (bridged and bridgeless) boost converters are designed to operate either in continuous conduction mode (CCM) or transition mode (TM, also known as critical conduction mode, CrCM) at full power. Both CCM and TM designs may utilize discontinuous conduction mode (DCM) as their low power mode. CCM operation has low RMS current levels but cannot achieve soft-switching during all switching transitions. Consequently, CCM designs tend to have lower conduction losses, but higher switching losses. The converse is true for TM operation, which has relatively higher RMS current levels but operates with soft-switching (low switching loss). Therefore, CCM designs tend to be used for high power level AC-DC applications, where input current levels are high and the designs benefit from reduced conduction losses. On the other hand, TM designs tend to be used for lower power AC-DC applications, where the input current levels are relatively low and the designs benefit from low switching losses.

There remain a number of non-trivial issues associated with such boost PFC converter designs.

SUMMARY

Techniques are disclosed for autonomous mode transition for multimode operation in power converters. The techniques can be embodied, for example, in a controller or an integrated circuit.

One example is a controller for a boost power factor correction (PFC) converter, the controller configured to operate the boost PFC converter in multiple operating modes. The operating modes include a continuous conduction mode (CCM), a transition mode (TM), and a hybrid mode in which the controller operates the converter in both CCM and TM within a same line cycle.

Another example is a controller for a boost power factor correction (PFC) converter. The controller includes a current control loop configured to compute an average inductor current for each of a first operation mode of the boost PFC converter and a second operation mode of the boost PFC converter, based on a current sample taken during a boost synchronous rectifier conduction period of the boost PFC converter. The controller further includes a mode transition circuit that includes digital logic circuitry and is configured to generate a pulse indicating zero-voltage switching (ZVS) has been achieved.

Another example is an integrated circuit. The integrated circuit includes an analog front-end having first, second, and third inputs, and first and second outputs, the first input to receive a first analog sense signal representative of an AC input voltage of a boost power factor correction (PFC) AC-to-DC converter, the second input to receive a second analog sense signal representative of a DC output voltage of the converter, the third input to receive a third analog sense signal representative of an inductor current of the converter, the first output to provide first and second digital signals, and the second output to provide a third digital signal, the first digital signal representative of the AC input voltage of the converter, the second digital signal representative of the DC output voltage of the converter, and the third digital signal representative of the inductor current of the converter. The integrated circuit further includes a digital core having fourth and fifth inputs, and a third output, the fourth input to receive the first and second digital signals, the fifth input to receive the third digital signal, and the third output to provide a pulse width modulation (PWM) control signal. The integrated circuit further includes an output buffer having a sixth input and a fourth output, the sixth input to receive the PWM control signal, and the fourth output to provide the PWM control signal for control of a switching device of the converter.

Another example is a method for autonomous mode selection in a boost power factor correction (PFC) AC-to-DC converter, the converter including an inductor and having a continuous conduction mode (CCM) and a transition mode (TM). The method includes: cause the converter to operate in CCM at a first inductor current level; cause the converter to operate in a hybrid mode at a second inductor current level, the second inductor current level being lower than the first inductor current level, and in the hybrid mode the converter operates in both CCM and TM within the same cycle of an AC input signal of the converter; and cause the converter to operate in TM at a third inductor current level, the third inductor current level being lower than the second inductor current level.

DETAILED DESCRIPTION

Figure 1A:
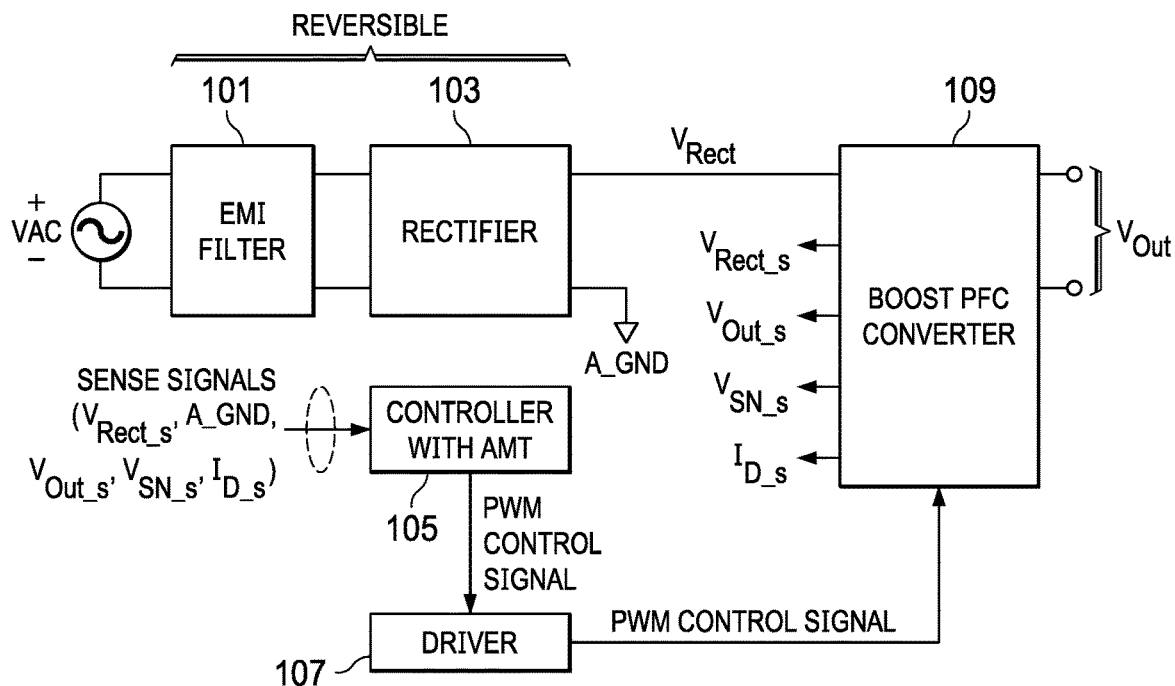
FIG. 1a is a block diagram of an example AC-DC power converter having a bridged boost PFC topology, in accordance with an embodiment of the present disclosure.

Techniques are provided herein for autonomous mode transition for multimode operation in bridged or bridgeless boost PFC converters. The techniques can be implemented, for example, in a mixed signal (analog and digital) multimode power factor correction (PFC) controller that enables high efficiency, high power density single phase PFC designs. The controller supports converter operation in continuous conduction mode (CCM), transition mode (TM), and discontinuous conduction mode (DCM), and can further operate in a hybrid operating mode referred to herein as partial zero-voltage switching mode, or PZM for short. In this hybrid mode, the converter operates with partial zero-voltage switching and it acts as a buffer mode for mode change between CCM and TM within the same half cycle of the AC input. A given boost converter can be operated in one of these modes (CCM or TM) as selected by the user, or in an autonomous configuration in which the controller chooses the operating mode based on the inductor current level. In some embodiments, the controller utilizes or otherwise operates in conjunction with serial passive resistive sensors to sense the input and output voltages, the switch-node voltage, and the falling portion of the boost inductor current, although active sensing methods can be used as well. In some examples, the controller implements average inductor current control and can achieve relatively high power factor and relatively low total harmonic distortion (THD) for all of the operating modes.

General Overview

As previously noted above, there remain a number of non-trivial issues associated with AC-DC boost PFC converter designs. For instance, a CCM design usually operates at a fixed switching frequency or a narrow range variable frequency and is well-suited for high power level AC-DC applications where input current levels are relatively high and the design benefits from reduced conduction losses. However, if such a CCM design is operated at lower power levels, the switching losses do not scale with input power, resulting in reduced efficiency at lower power levels. In addition, standard CCM designs utilize higher value inductors to reduce the current ripple and maximize the converter operation in CCM. The higher the inductor value for a given current/power level, the larger the inductor tends to be, thereby consuming more space. On the other hand, a TM design operates with a switching frequency that changes as a function of line and load to facilitate zero-voltage switching (ZVS) and is well-suited for medium to low power level applications where the input current levels are relatively low and the design benefits from low switching losses. However, such a TM design tends to suffer from higher conduction losses at peak power and lower line voltages, resulting in lower efficiency at higher power levels. In this manner, the power range supported by a given TM or CCM design can be limited. As previously noted, some designs utilize DCM as their low power mode, with the mode transition to or from DCM happening at the line zero crossing. Such designs do not allow for hybrid mode or otherwise remedy the above noted deficiencies. To this end, boost PFC converter designs that provide high efficiency across a broad range of power levels would be beneficial.

Thus, and according to an embodiment of the present disclosure, an autonomous mode transition (AMT) methodology is provided herein which enables a multimode boost PFC converter. In particular, the converter can autonomously transition between CCM and TM based on the input current levels, and can further operate in a hybrid operating mode. In the hybrid operating mode, the converter can operate in both CCM and TM within the same half cycle of the AC input. According to some embodiments, the hybrid operating mode allows for smooth transition between CCM and TM without degrading input current total harmonic distortion (THD), and further allows for a high and flat efficiency for the converter across line voltage and load variations, as well as a reduced inductance value for the boost inductor. The AMT methodology can be implemented in the controller of a power converter having any number of boost PFC converter topologies.

In more detail, and according to some embodiments, the boost PFC converter is operated in CCM at relatively high input current levels (peak power and/or low line voltage) to increase efficiency by taking benefit of the reduced conduction losses. For lower input current levels (lower power and/or high line voltage), the converter is operated in TM thereby enabling higher efficiency due to reduced switching losses. Between these two operating modes, the converter is operated in the hybrid mode, in which the converter operates in both CCM and TM within the same half cycle of the AC input. In particular, the converter operates in CCM towards the peak of the AC input, and in TM on either side of the peak. As the input current continues to decrease, the proportion of the CCM operation continues to decrease and the proportion of TM operation continues to increase until the converter fully operates in TM. Thus, a smooth mode transition is accomplished, with little or no jumps in the switching frequency. In some embodiments, a ground-referenced resistive sense scheme is used to sense voltage and current parameters (e.g., input voltage, switching node voltage, output voltage, inductor current) which are then used by the controller to appropriately control the input current and to provide relatively low input current THD for all operating modes and transitions.

The AMT methodology can be used by any number of AC-DC boost PFC converter topologies, including bridged and bridgeless. Example topologies include, for instance, a single phase bridged boost PFC converter, a totem-pole bridgeless boost PFC converter, and an AC-switch bridgeless boost PFC converter. Each such topology can operate the converter in the hybrid mode (both CCM and TM) as a function of input current/load and within the same line cycle, in addition to operating in CCM, TM, or DCM. In addition, and according to some embodiments, any such topologies can be configured with a ground-referenced resistive current sense scheme, which avoids the use of external methods of current sense, such as Hall-effect sensors or isolated op-amps, and reduces overall system cost. Example embodiments for these topologies are provided herein.

Note that multimode operation and autonomous mode transition as provided herein can be accomplished with any number of current control schemes. In some example embodiments, average current control is utilized. In other example embodiments, other current control methodologies can be used, such as peak current control, valley current control, one cycle control, or open loop current control.

So, the AMT methodology has a number of benefits with respect to the performance of AC-DC boost PFC converters. For example, unlike designs that operate only in CCM, TM or DCM, a bridged or bridgeless boost PFC converter having a controller configured with AMT methodology according to an embodiment of the present disclosure includes a hybrid mode that allows for a more seamless transition between CCM and TM. The multimode operation enabled by the AMT methodology results in relatively high and flat efficiency for wide operating output power ranges (load conditions). In some embodiments, the PFC converter configured with AMT maintains an efficiency of greater than 98% for a wide output power range (e.g., from less than 50 watts to over 600 watts), according to simulation results. Moreover, the multimode operation enabled by the AMT methodology allows for relatively low THD to be maintained for all operating modes/transition mode, according to some embodiments. In contrast, traditional CCM boost converter designs cannot appropriately control input currents in response to the converter going out of CCM, resulting in higher THD for such conditions. In addition, the AMT methodology provided herein allows the boost inductance value of the converter to be relatively lower compared to traditional CCM boost converter designs, which use high inductance values to maintain the CCM operation for wide output power ranges. Smaller inductance values means smaller inductors, which take up less space, so there is a space savings as well. In addition, as previously noted above, the ground-based sensing scheme according to some embodiments avoids the use of more costly sensing methods.

Boost PFC Converter Examples

FIG. 1a is a block diagram of an example AC-DC power converter having a bridged boost PFC topology, in accordance with an embodiment of the present disclosure. As can be seen, this example configuration includes an EMI filter 101, a rectifier 103, a controller 105, a driver 107, and a boost PFC converter 109. Note that the location of the EMI filter 101 and rectifier 103 can be switched, if so desired, or there could be an EMI filter on both sides of the rectifier 103. Further note that while each of the above noted components is shown as being separate, other embodiments may be integrated in a different manner. For instance, other embodiments may integrate the EMI filter(s) 101 and rectifier 103 into the converter 109. Likewise, the driver 107 can be integrated into the controller 105 in some cases, or into the converter 109 in other cases, or partially into both the controller 105 and the converter 109 in other cases, for example. Numerous such variations will be appreciated in light of this disclosure.

The EMI filter 101 is configured to reduce electromagnetic interference (EMI) and can be implemented with standard or otherwise suitable EMI filter technology. For instance, the EMI filter 101 may include a number of capacitors and inductors, connected together to form a passive LC circuit. In some such cases, one or more serial inductors block or otherwise attenuate unwanted high-frequency currents but allow the desired DC or low frequency currents to pass through. In addition, one or more parallel capacitors provide a low impedance path to divert the high-frequency noise to ground or otherwise away from the input of the converter 109. Other embodiments may employ an active EMI filter. The present disclosure is not intended to be limited to any particular type of EMI filter. In still other embodiments, no EMI filter 101 is present. EMI filter 101 may be used, for example, to comply with given regulatory standards and/or performance goals with respect to suppressing unwanted electromagnetic emissions, whether the unwanted emissions be conducted and/or radiated EMI.

The rectifier 103 is configured to convert the AC input signal (VAC) to a rectified DC signal ($V_{Rect}$), and can be implemented with standard or otherwise suitable rectification circuitry. For instance, the rectifier 103 may be implemented with any number of diode technologies, such as rectifier diodes, Schottky diodes, or MOSFET diodes (also called diode-connected MOSFETs), arranged to form a full wave bridge rectifier. Note that the rectifier bridge may be passive or active. The present disclosure is not intended to be limited to any particular type of rectifier.

The controller 105 is configured with autonomous mode transition (AMT), in accordance with an embodiment of the present disclosure. The controller 105 supports multiple modes, such CCM, TM, and DCM. In addition, the controller 105 can further operate in a hybrid mode to autonomously transition between CCM and TM based on the input current levels. In the hybrid mode, the converter can operate in both CCM and TM within the same half cycle of the AC input. As can be seen in FIG. 1a, the controller 105 receives of a number of analog sense signals from the converter 109, and uses those sense signals to generate the pulse width modulation (PWM) signal to control the switching of converter 109, so as to deliver the desired load current. The sense signals in this example embodiment include $V_{Rect\_s}$ which represents the input voltage $V_{Rect}$, $V_{Out\_s}$ which represents the output voltage $V_{Out}$, $V_{SN\_s}$ which represents the switching node voltage $V_{SN}$, and $I_{D\_s}$ which represents the falling portion of inductor current (referred to herein as $I_D$, which corresponds to the current through the boost synchronous rectifier of converter 109, during the synchronous rectifier conduction period). Further details of controller 105 in the context of bridged boost PFC topology will be explained in turn.

The driver 107 is configured to drive the PWM signal generated by controller 105 to the switching device of converter 109, and can be implemented with standard or otherwise suitable driver circuitry. For instance, in one such embodiment the driver 107 includes the ground-referenced low-side driver of a half-bridge driver chip, or a comparable gate driver circuit such as a power amplifier configured to receive a relatively low power input from controller 105 and generate a relatively high current signal sufficient to drive the switching device of converter 109. Note that the driver 107 may include or otherwise be used in conjunction with features such as level shifting and/or electrical isolation. Level shifting can be used to better condition the drive signal for its intended purpose of driving the switching element, which may call for a specific voltage range, for instance. Electrical isolation can be provided, for instance, in accordance with regulatory standards, to allow for safe referencing to any node within the converter (e.g., for a non-ground-referenced switching element), and/or to isolate controller 105 from high voltage. Further note that in some embodiments, the driver 107 may be, for instance, integrated into a chip package along with the converter 109 switching device that it is driving, or integrated into the circuitry of the controller 105. The present disclosure is not intended to be limited to any particular driver circuitry.

The boost PFC converter 109 receives the rectified signal $V_{Rect}$ and generates a regulated output voltage $V_{Out}$ and supplies the load with the desired current, as controlled by controller 105. As can be seen in FIG. 1a, the converter 109 includes or is otherwise used in conjunction with sensing circuitry that generates a number of analog sense signals. In this example embodiment, the analog sense signals include: $V_{Rect\_s}$, $V_{SN\_s}$, $V_{Out\_s}$, and $I_{D\_s}$, as previously noted with respect to the controller 105. As can be further seen in FIG. 1a, the input voltage $V_{Rect}$ is sensed with respect to ground (A_GND), which is also available to the controller 105. As previously noted controller 105 uses these sense signals to generate the PWM signal to control the switching element of converter 109, so as to deliver the desired load current. In operation, the VAC input is applied to the input of the EMI filter 101 and the rectifier 103, thereby producing the rectified sinusoidal input voltage signal, $V_{Rect}$. The boost PFC converter 109 then converts $V_{Rect}$ to a regulated DC voltage $V_{Out}$ at its output, while maintaining a desired power factor. Further details of example bridged boost PFC converter circuitry and sensing circuitry will be explained in turn.

Figure 1B:
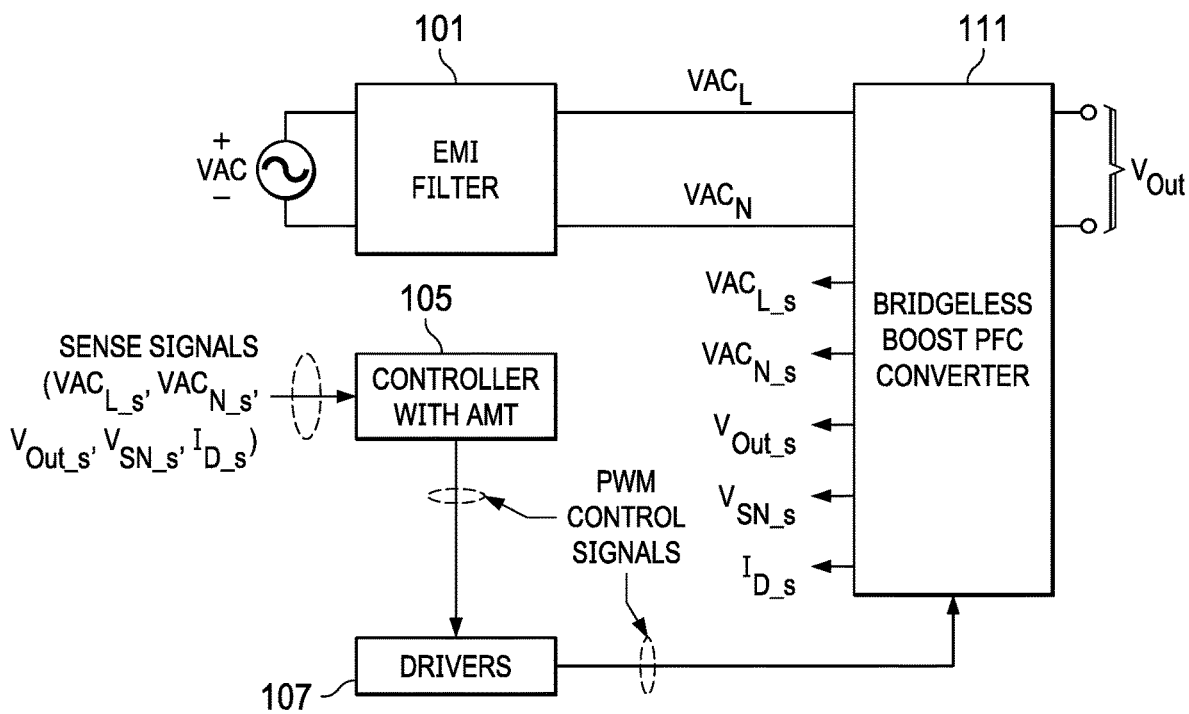
FIG. 1b is a block diagram of an example AC-DC power converter having a bridgeless boost PFC topology, in accordance with an embodiment of the present disclosure.

As previously noted above, the maximum efficiency achieved by a bridged boost PFC converter is limited due to conduction losses in the rectifier 103. To reduce such losses, a bridgeless topology can be used. FIG. 1b is a block diagram of an example AC-DC power converter having a bridgeless boost PFC topology, in accordance with an embodiment of the present disclosure. As can be seen, this example configuration includes an EMI filter 101, a controller 105, drivers 107, and a bridgeless boost PFC converter 111. Note that the rectifier 103 is no longer used, given the bridgeless boost PFC converter 111. Further note that while each of the above noted components is shown as being separate, other embodiments may be integrated in a different manner. For instance, other embodiments may integrate the EMI filter 101 into the converter 109. Likewise, the drivers 107 can be integrated into the controller 105 in some cases, or into the converter 111 in other cases, or partially into both the controller 105 and the converter 111 in other cases, for example. Numerous such variations will be appreciated in light of this disclosure.

The previous relevant discussion with respect to EMI filter 101, controller 105, and driver 107 is equally applicable here, with some notable differences.

One such difference between bridged and bridgeless boost PFC converter topologies is with respect to the sense signals. In particular, and in contrast to a bridged topology as shown in FIG. 1a, here the VAC input signal is not rectified prior to the converter input, as rectification is effectively carried out by the bridgeless boost PFC converter 111. So, in this example embodiment, the sense signals received by the controller 105 include: $VAC_{L\_s}$ which represents the AC line input voltage $VAC_L$, $VAC_{N\_s}$ which represents the AC neutral input voltage $VAC_N$, $V_{Out\_s}$ which represents the output voltage $V_{Out}$, $V_{SN\_s}$ which represents the switching node voltage $V_{SN}$, and $I_{D\_s}$ which represents the falling portion of inductor current (referred to herein as $I_D$, which corresponds to the current through the diode or FET or other boost synchronous rectifier device of converter 111, during synchronous rectifier conduction period). Further details of the controller 105 in the context of various example bridgeless boost PFC converter topologies will be explained in turn.

Another difference between bridged and bridgeless boost PFC converter topologies is with respect to the drivers 107. In particular, the number and type of drivers 107 depends on the converter topology used. For instance, in one example embodiment where converter 111 has a totem-pole bridgeless boost topology, the drivers 107 include a first pair of drivers for the high-frequency leg of the converter and a second pair of drivers for the low frequency leg of the converter. In one such case, each of the first and second driver pairs can be, for example, the low-side and high-side drivers of a half-bridge driver chip, or comparable gate driver circuitry. As previously explained above, the drivers 107 may include or otherwise be used in conjunction with features such as level shifting and/or electrical isolation, and may be integrated to some extent with other features. In a more general sense, if a given switching element is ground-referenced (e.g., the low-side switching element of a half-bridge), the gate driver 107 can be non-isolated. On the other hand, if the switching element is not ground-referenced (e.g., such as in the case of an AC bridgeless boost topology, or the high-side switching element of a half-bridge where the source or emitter of the switching element is floating or otherwise not connected to ground), level-shifting can be achieved by an isolated driver or a standard driver using a separate digital isolator. Signal and power can still pass between isolated circuits using inductive, capacitive or optical methods (e.g., gate drive transformers or an optocoupler). Again, the present disclosure is not intended to be limited to any particular driver circuitry, and numerous suitable driver circuits can be used in a given configuration.

Another difference is the boost PFC topology itself. Here, the bridgeless boost PFC converter 111 receives both the $VAC_L$ and $VAC_N$ signals, and generates a regulated output voltage $V_{Out}$ and supplies the load with the desired current, as controlled by controller 105. As can be seen in FIG. 1b, the converter 111 includes or is otherwise used in conjunction with sensing circuitry that generates a number of analog sense signals. In this example embodiment, the analog sense signals include: $VAC_{L\_s}$, $VAC_{N\_s}$, $V_{SN\_s}$, $V_{Out\_s}$, and $I_{D\_s}$. The controller 105 uses these sense signals to generate the PWM signals to control the switching elements of converter 111, so as to deliver the desired load current. In operation, the VAC input is applied to the input of the EMI filter 101, and the $VAC_L$ and $VAC_N$ signals are provided to converter 111. The converter 111 then converts that sinusoidal input to a regulated DC voltage $V_{Out}$ at its output, while maintaining a desired power factor. Further details of various example bridgeless boost PFC converter circuitry and sensing circuitry will be explained in turn.

Figure 2A:
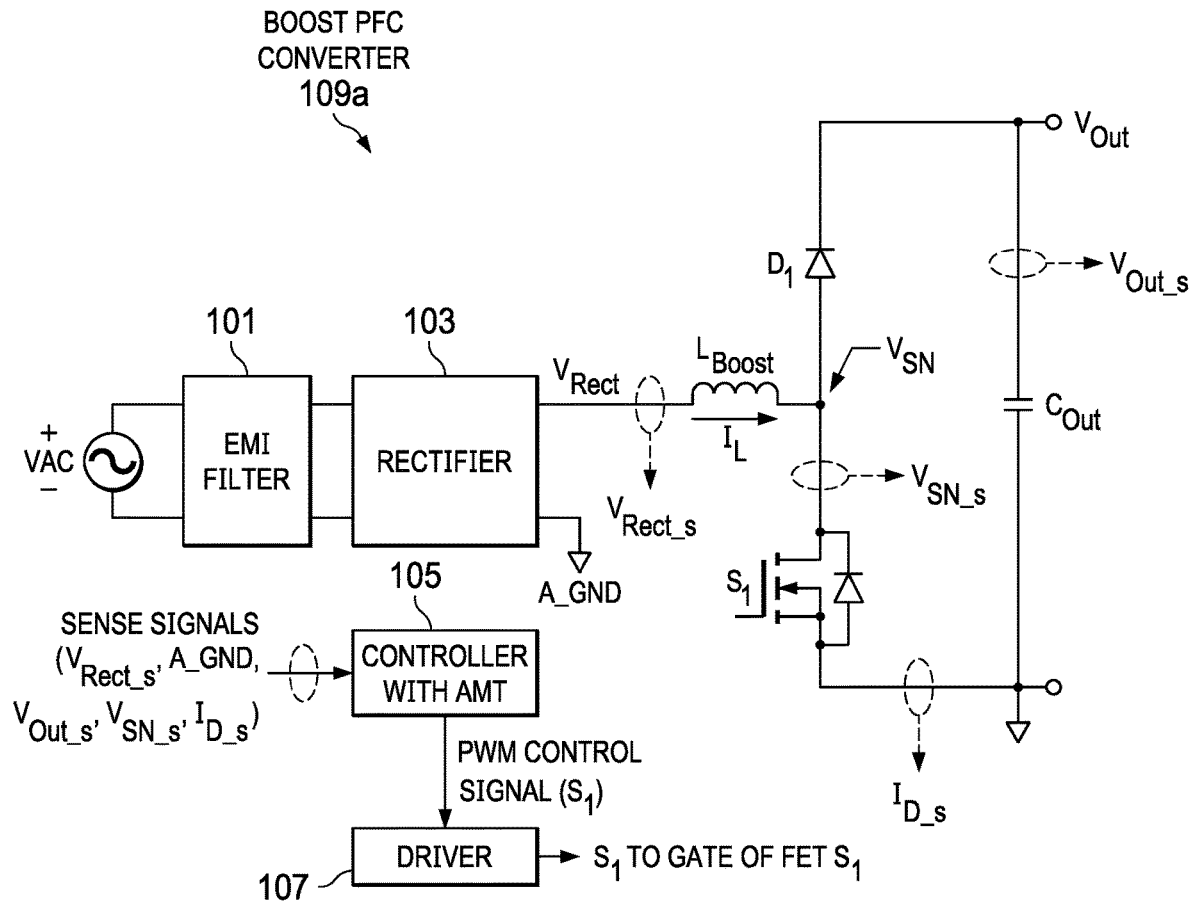
FIG. 2a schematically illustrates an example AC-DC power converter having a single phase bridged boost PFC topology, in accordance with an embodiment of the present disclosure.

FIG. 2a schematically illustrates details of an example bridged boost PFC topology, in accordance with an embodiment of the present disclosure. As can be seen, this example embodiment includes a single phase boost PFC converter 109a, which includes a boost inductor $L_{Boost}$, switch $S_1$, diode $D_1$, and output capacitor $C_{Out}$. The previous relevant bridged boost PFC topology discussion with respect to EMI filter 101, rectifier 103, controller 105, and driver 107 is equally applicable here.

Inductor $L_{Boost}$, switch $S_1$, and diode $D_1$ together form the boost stage while, and output capacitor $C_{Out}$ acts as an energy store, which in conjunction with closed loop PFC control provided by controller 105, provides regulated DC voltage output $V_{Out}$ to the load. Each of these components can be implemented with standard components. In one example case, the switch $S_1$ is implemented with a silicon super-junction power MOSFET (e.g., 650 V, 30 mΩ), and diode $D_1$ is either an ultra-fast recovery or a wide bandgap schottky diode to help reduce reverse-recovery based losses in the converter. In a more general sense, any suitable power switching and rectifier devices can be used to implement the switch $S_1$ and diode $D_1$, respectively. To this end, the present disclosure is not intended to be limited to any particular switching and rectifier devices, or to any semiconductor materials or processes.

Figure 2B:
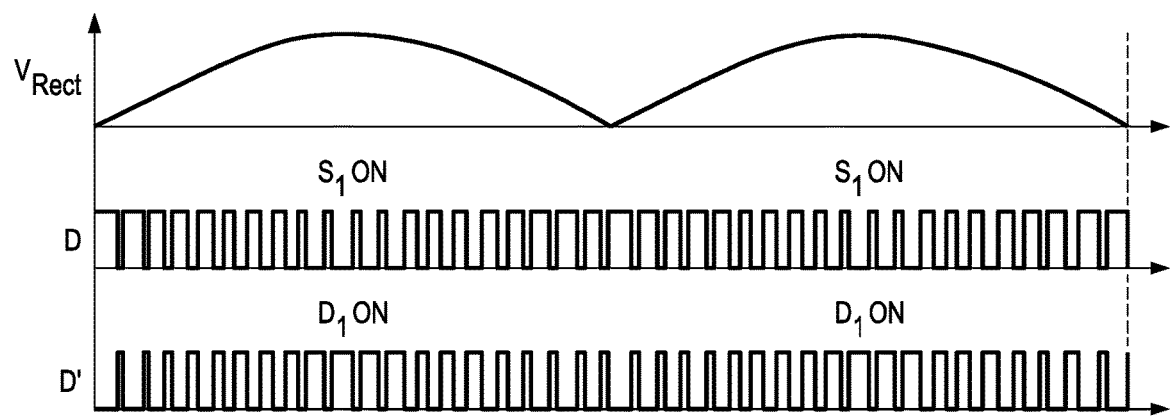
FIG. 2b illustrates operational details of the example AC-DC power converter of FIG. 2a, in accordance with an embodiment of the present disclosure.

The basic operation of the converter 109a is shown in FIG. 2b, according to an embodiment. Note that input $V_{Rect}$ is the rectified version of VAC and as such includes two positive half cycles, and that switch $S_1$ and diode $D_1$ operate the same for each half cycle. In particular, switch $S_1$ operates as the boost active switch during the high portion of the PWM switching duty cycle (designated as D herein), and diode $D_1$ operates as a boost synchronous rectifier during the low portion of the PWM switching duty cycle (designated as D' herein). Note that the duty cycle D refers to the time switch $S_1$ is conducting, and duty cycle D' refers to the time diode $D_1$ is conducting. As will be explained in turn, controller 105 determines D and D' based on sensed signals $V_{Rect\_s}$, $V_{SN\_s}$, $V_{Out\_s}$, and $I_{D\_s}$, which can be sensed using any suitable sensing circuit.

The sensing circuitry can be implemented with passive or active circuitry. In some example embodiments, any of the sensing circuits (generally designated with dashed lines in FIG. 2a) can be implemented with a Hall-effect sensor, a current sensing transformer, an isolated amplifier, to name a few example techniques. For instance, a Hall-effect sensor can be used to sense the falling portion of inductor current, and an isolated amplifier can be used to sense each of the input voltage $V_{Rect}$, the switching node voltage $V_{SN}$, and the output voltage $V_{Out}$. In still other example embodiments, each of the sensing circuits are implemented with ground-referenced resistive sensing circuits, as will be further discussed with reference to the example embodiment of FIG. 2c.

Figure 2C:
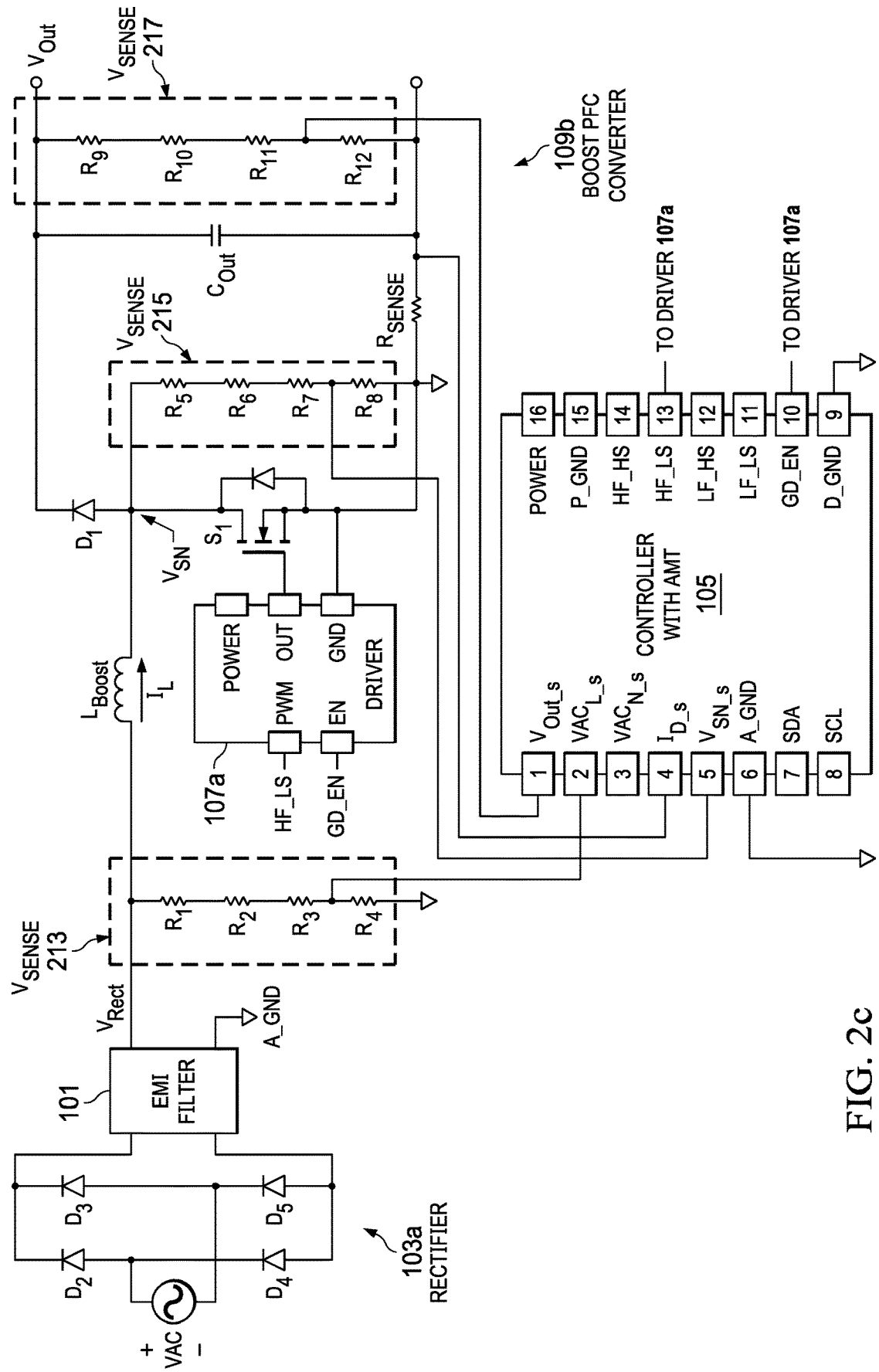
FIG. 2c schematically illustrates another example AC-DC power converter having a single phase bridged boost PFC topology, in accordance with an embodiment of the present disclosure.

FIG. 2c schematically illustrates another example AC-DC power converter having a single phase bridged boost PFC topology, in accordance with an embodiment of the present disclosure. The previous relevant bridged boost PFC topology discussion with respect to each of EMI filter 101, rectifier 103, controller 105, driver 107, and boost PFC converters 109 and 109a is equally applicable here, except that some further example details are provided here. As can be seen, the input signal VAC is rectified by rectifier 103a, which in this example case is implemented with rectifier diodes $D_1$-$D_4$. EMI filter 101 can be any suitable EMI filter circuit as previously explained, but note in this embodiment is after the rectifier 103a. As can be further seen in this example embodiment, controller 105 is shown with an example pinout, so as to facilitate subsequent discussion of the controller 105, with respect to FIG. 5. Note the pinout is arbitrary and other example embodiments may include more or fewer pins, while in still other embodiments the controller 105 may be implemented with discrete or individual components populated on a printed circuit board or other substrate (rather than an integrated circuit). In addition, driver 107a in this example case is implemented a ground-referenced low-side driver of a half-bridge driver chip.

As can be further seen, boost PFC converter 109b includes some ground-referenced resistive voltage divider sense circuits, including $V_{Sense}$ 213 for sensing $V_{Rect}$, $V_{Sense}$ 215 for sensing $V_{SN}$, and $V_{Sense}$ 217 for sensing $V_{Out}$. $V_{Sense}$ 213 includes resistors $R_1$-$R_4$, $V_{Sense}$ 215 includes resistors $R_5$-$R_8$, and $V_{Sense}$ 217 includes resistors $R_9$-$R_{12}$. Note that the number of resistors in a given voltage divider can be varied to accommodate design standards or specifications, such as limits on power dissipation across a given resistor or other component. To this end, in other embodiments, each of $V_{Sense}$ 213, $V_{Sense}$ 215, and $V_{Sense}$ 217 may include fewer (e.g., two) or more (e.g., eight) resistors, and the present disclosure is not intended to be limited to any particular resistive divider configuration. In this example case, the output of $V_{Sense}$ 213 is $V_{Rect}(R_4)/[R_1+R_2+R_3+R_4]$, which in a bridged topology is applied to the $VAC_{L\_s}$ pin of controller 105 (further note that the $VAC_{L\_s}$ pin of controller 105 can be tied to ground, A_GND, in a bridged topology). Likewise, the output of $V_{Sense}$ 215 is $V_{SN}(R_8)/[R_5+R_6+R_7+R_8]$, which is applied to the $V_{SN\_s}$ pin of controller 105. Likewise, the output of $V_{Sense}$ 217 is $V_{Out}(R_{12})/[R_9+R_{10}+R_{11}+R_{12}]$, which is applied to the $V_{Out\_s}$ pin of controller 105. As can be further seen, boost PFC converter 109b includes a ground-referenced resistive current sensing circuit $R_{Sense}$ for sensing $I_D$. Although a single resistor is shown, other embodiments may include two or more resistors connected in parallel. The voltage drop across $R_{Sense}$ is applied to the $I_{D\_s}$ pin of controller 105. Given the voltage drop ($V_{Drop\_sense}$) and the resistive value of $R_{Sense}$, the current can be readily computed as $V_{Drop\_sense}/R_{Sense}$. In some embodiments, $R_{Sense}$ is used in conjunction with a low pass filter (to remove or otherwise reduce undesired high-frequency signals). For instance, the filter may include a serial resistor and a parallel ground-referenced capacitor, along the sense line going to the $I_{D\_s}$ pin of controller 105.

As can be further seen, controller 105 has a number of gate driver outputs which provide PWM control signals, including a low-frequency low-side (LF_LS) output, a low-frequency high-side (LF_HS) output, a high-frequency low-side (HF_LS) output, a high-frequency high-side (LF_HS) output. In a bridged boost PFC topology such as this one, the switch $S_1$ is driven by the HF_LS output, which is thus applied to the PWM input of gate driver 107a. Further note that controller 105 provides a gate driver enable (GD_EN) output, which is applied to the enable input of the gate driver 107a. The ground-referenced output of the driver 107a is applied to the gate of switch $S_1$. Each of the ground inputs of controller 105, including analog ground (A_GND), digital ground (D_GND), and power ground (P_GND) are connected to provide a common ground plane, in accordance with standard grounding principles. Further example details of controller 105 will be explained in turn.

Figure 3A:
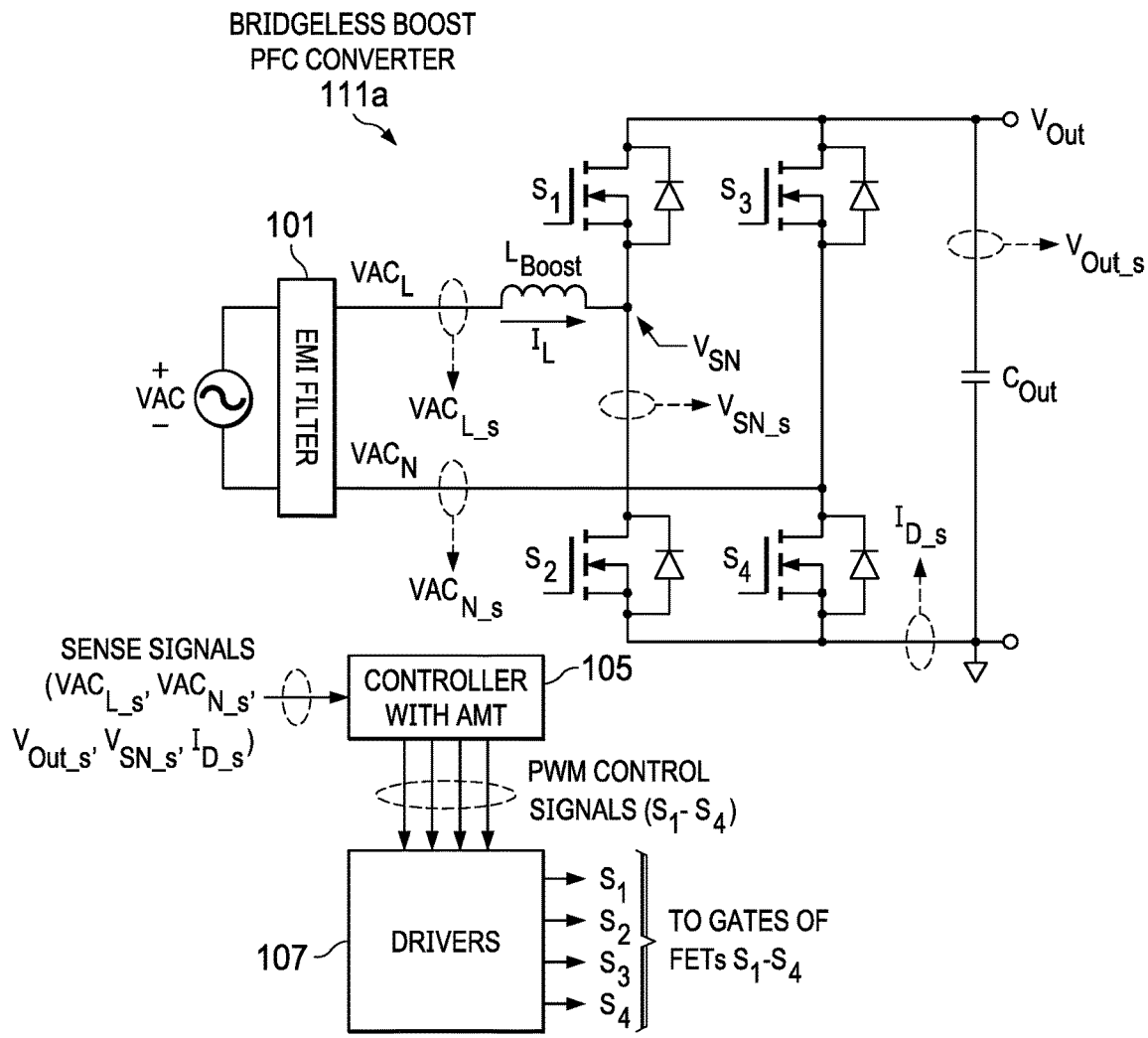
FIG. 3a schematically illustrates an example AC-DC power converter having a totem-pole bridgeless boost PFC topology, in accordance with an embodiment of the present disclosure.

FIG. 3a schematically illustrates details of an example bridgeless boost PFC topology, in accordance with an embodiment of the present disclosure. As can be seen, this example embodiment includes a totem-pole bridgeless boost PFC converter 111a, which includes a boost inductor $L_{Boost}$, switches $S_1$-$S_4$, and output capacitor $C_{Out}$. The previous relevant bridgeless boost PFC topology discussion with respect to EMI filter 101, controller 105, and drivers 107 is equally applicable here. Recall that the totem-pole bridgeless boost topology avoids the use of an input bridge rectifier and reduces the number of series conduction devices, thereby resulting in higher efficiency.

A totem-pole bridgeless boost converter includes two half-bridge legs, a high-frequency leg and a low-frequency leg. The high-frequency leg includes switches $S_1$ and $S_2$ and operates at the switching frequency, while the low-frequency leg includes switches $S_3$ and $S_4$ and operates at the input line frequency. Inductor $L_{Boost}$ and switches $S_1$, $S_2$ and $S_4$ together form the boost stage for the positive line cycle, while inductor $L_{Boost}$ and switches $S_1$, $S_2$ and $S_3$ together form the boost stage for the negative line cycle. In addition, output capacitor $C_{Out}$ acts as an energy store for both boost stages, which in conjunction with closed loop PFC control provided by controller 105, provides regulated DC voltage output $V_{Out}$ to the load. Each of these components can be implemented with standard components. In one example case, the switches $S_1$ and $S_2$ are implemented with a wide-band gap semiconductor material switching devices such as gallium nitride (GaN) or silicon carbide (SiC) power MOSFETs (e.g., 650 V, 50 mΩ), and switches $S_3$ and $S_4$ are implemented with a silicon super-junction power MOSFETs (e.g., 650 V, 30 mΩ). In other embodiments all of S1-S4 can be implemented with the same devices (e.g., silicon, GaN, SiC, etc.). In a more general sense, any suitable power switching and rectifier devices can be used to implement the switches $S_1$-$S_4$, respectively. To this end, the present disclosure is not intended to be limited to any particular switching and rectifier devices, or to any semiconductor materials or processes.

Figure 3B:
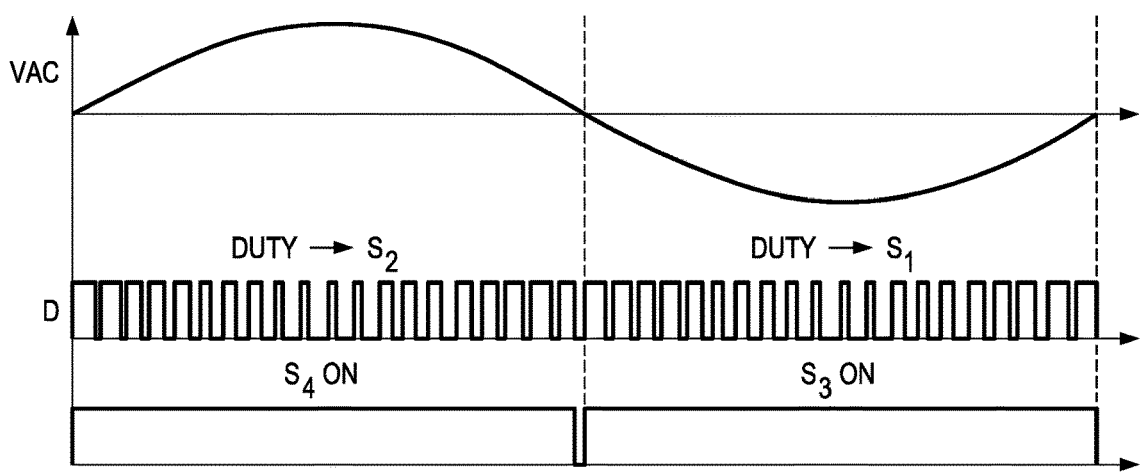
FIG. 3b illustrates operational details of the example AC-DC power converter of FIG. 3a, in accordance with an embodiment of the present disclosure.

The basic operation of the converter 111a is shown in FIG. 3b, according to an embodiment. Note that input VAC includes a positive half cycle and a negative half cycle, and that switches $S_1$-$S_4$ operate differently for each half cycle. In particular, during the positive line cycle, switch $S_2$ operates as the boost active switch with duty cycle D, whereas switch $S_1$ operates as the boost synchronous rectifier with duty cycle D', and switch $S_4$ is kept on for the entire positive half line cycle. During the negative line half cycle, the roles are reversed, such that switch $S_1$ operates as the boost active switch with duty cycle D, switch $S_2$ operates as the boost synchronous rectifier with duty cycle D', and switch $S_3$ is kept on for the entire half line cycle. In the positive line half cycle, the duty cycle D refers to the time switch $S_2$ is conducting, and duty cycle D' refers to the time switch $S_1$ is conducting. Similarly, in the negative line half cycle, the duty cycle D refers to the time switch $S_1$ is conducting, and duty cycle D' refers to the time switch $S_2$ is conducting. As will be explained in turn, controller 105 determines D and D' based on sensed signals $VAC_{L\_s}$, $VAC_{N\_s}$, $V_{SN\_s}$, $V_{Out\_s}$, and $I_{D\_s}$, which can be sensed using any suitable sensing circuit.

The sensing circuitry can be implemented with passive or active circuitry. In some example embodiments, any of the sensing circuits (generally designated with dashed lines in FIG. 3a) can be implemented with a Hall-effect sensor, a current sensing transformer, an isolated amplifier, to name a few example techniques. For instance, a Hall-effect sensor can be used to sense the falling portion of inductor current, and an isolated amplifier can be used to sense each of the input voltages $VAC_L$ and $VAC_N$, the switching node voltage $V_{SN}$, and the output voltage $V_{Out}$. In still other example embodiments, each of the sensing circuits are implemented with ground-referenced resistive sensing circuits, as will be further discussed with reference to the example embodiment of FIG. 3c.

Figure 3C:
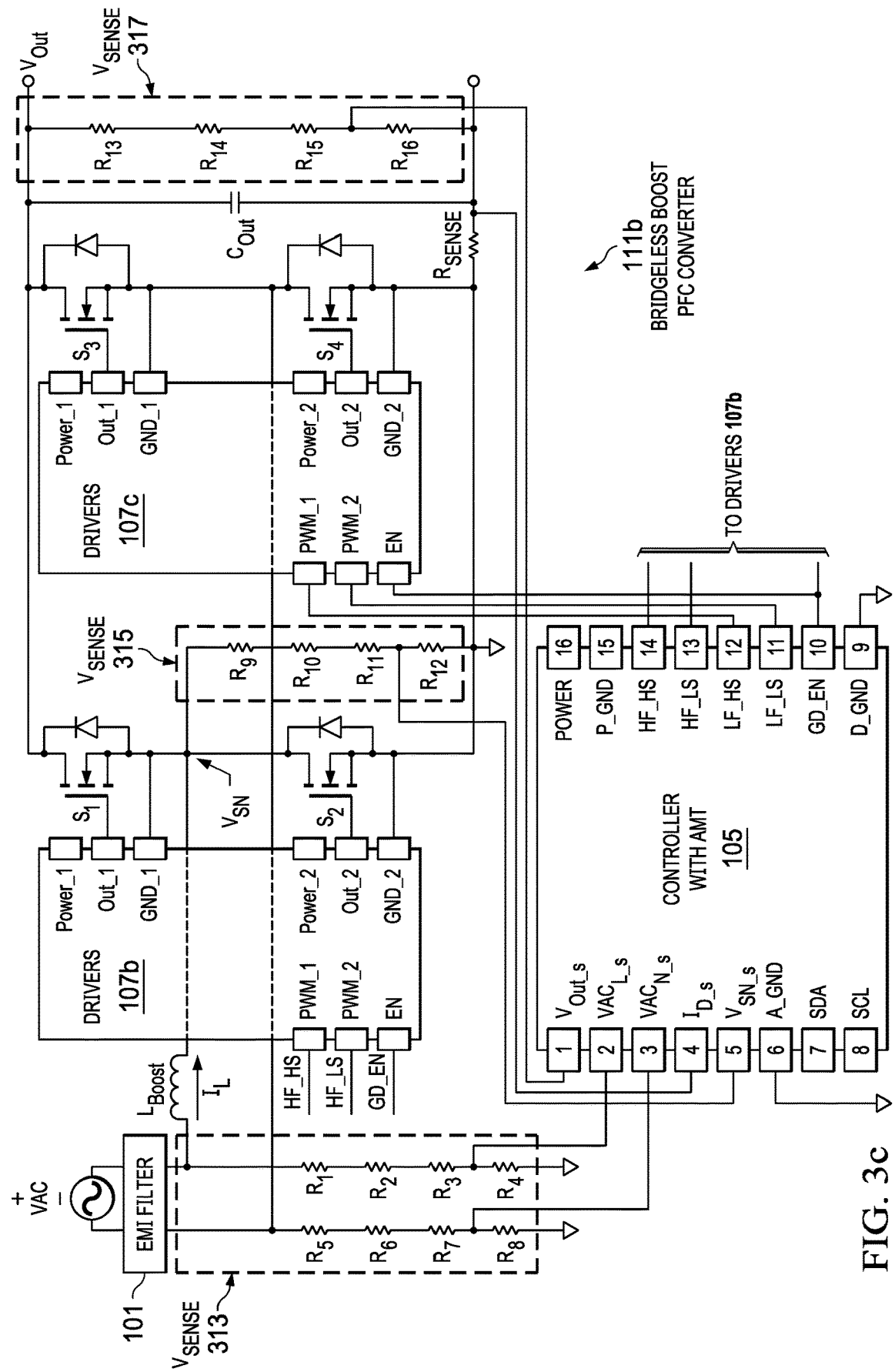
FIG. 3c schematically illustrates another example AC-DC power converter having a totem-pole bridgeless boost PFC topology, in accordance with an embodiment of the present disclosure.

FIG. 3c schematically illustrates another example AC-DC power converter having a totem-pole bridgeless boost PFC topology, in accordance with an embodiment of the present disclosure. The previous relevant bridgeless boost PFC discussion with respect to each of EMI filter 101, controller 105, drivers 107, and bridgeless boost PFC converters 111 and 111a is equally applicable here, except that some further example details are provided here. As can be seen in this example embodiment, controller 105 is shown with the same example pinout as previously discussed above, and that relevant discussion is equally applicable here. In addition, drivers 107b and 107c in this example case are both implemented with a corresponding half-bridge driver chip, such that the low-side switches $S_2$ and $S_4$ are driven by a corresponding ground-referenced low-side driver, and the high-side switches $S_1$ and $S_3$ are driven by a corresponding non-ground-referenced high-side driver.

As can be further seen, bridgeless boost PFC converter 111b includes some ground-referenced resistive voltage divider sense circuits, including $V_{Sense}$ 313 for sensing $VAC_L$ and $VAC_N$, $V_{Sense}$ 315 for sensing $V_{SN}$, and $V_{Sense}$ 317 for sensing $V_{Out}$. $V_{Sense}$ 313 includes resistors $R_1$-$R_8$, $V_{Sense}$ 315 includes resistors $R_9$-$R_{12}$, and $V_{Sense}$ 317 includes resistors $R_{13}$-$R_{16}$. As previously explained above, the number of resistors in a given voltage divider can be varied from one embodiment to the next, and the present disclosure is not intended to be limited to any particular resistive divider configuration. In this example case, the input voltage VAC is sensed differentially, so $V_{Sense}$ 313 includes matched resistor dividers for sensing $VAC_L$ and $VAC_N$, respectively. In particular, the output of the one of the matched resistor dividers is $VAC_L(R_4)/[R_1+R_2+R_3+R_4]$, which in a bridgeless topology is applied to the $VAC_{L\_s}$ pin of controller 105, and the output of the other of the matched resistor dividers is $VAC_N(R_8)/[R_5+R_6+R_7+R_8]$, which is applied to the $VAC_{N\_s}$ pin of controller 105. Likewise, the output of $V_{Sense}$ 315 is $V_{SN}(R_{12})/[R_9+R_{10}+R_{11}+R_{12}]$, which is applied to the $V_{SN\_s}$ pin of controller 105. Likewise, the output of $V_{Sense}$ 317 is $V_{Out}(R_{16})/[R_{13}+R_{14}+R_{15}+R_{16}]$, which is applied to the $V_{Out\_s}$ pin of controller 105. As can be further seen, bridgeless boost PFC converter 111b includes a ground-referenced resistive current sensing circuit $R_{Sense}$ for sensing $I_D$. As previously noted above, other embodiments may include two or more resistors connected in parallel for $R_{Sense}$. The previous relevant discussion with respect to how the voltage drop ($V_{Drop\_sense}$) across $R_{Sense}$ is applied to the $I_{D\_s}$ pin of controller 105, and how $R_{Sense}$ can be used in conjunction with a low pass filter is equally applicable here.

According to some embodiments of the present disclosure, the resistor divider ratio of $V_{Sense}$ 313 for sensing the input voltage (differentially, $VAC_L$ and $VAC_N$) is the same resistor divider ratio of $V_{Sense}$ 317 for sensing the output voltage $V_{Out}$. So, for instance, each of: $R_4/(R_1+R_2+R_3+R_4)$, $R_8/(R_5+R_6+R_7+R_8)$, and $R_{16}/(R_{13}+R_{14}+R_{15}+R_{16})$ are the same ratio (within a suitable tolerance, such as +/−5% or better), according to some such embodiments. Note a similar strategy can be applied to $V_{Sense}$ 213 and $V_{Sense}$ 217 of the example of FIG. 2c. Such a matched arrangement will facilitate ease of control implementation.

As previously explained above, controller 105 has a number of gate driver outputs which provide PWM control signals, including a low-frequency low-side (LF_LS) output, a low-frequency high-side (LF_HS) output, a high-frequency low-side (HF_LS) output, a high-frequency high-side (HF_HS) output. In a bridgeless boost PFC topology such as this one, the switch $S_1$ is driven by the HF_HS output, which is thus applied to the PWM_1 input of gate driver 107b. Likewise, the switch $S_2$ is driven by the HF_LS output, which is thus applied to the PWM_2 input of gate driver 107b. In a similar fashion, the switch $S_3$ is driven by the LF_HS output, which is thus applied to the PWM_1 input of gate driver 107c. Likewise, the switch $S_4$ is driven by the LF_LS output, which is thus applied to the PWM_2 input of gate driver 107c. Further note that controller 105 provides a gate driver enable (GD_EN) output, which is applied to the enable input of both drivers 107b and 107c. The non-ground-referenced output (Out_1) of the driver 107b is applied to the gate of switch $S_1$, and the ground-referenced output (Out_2) of the driver 107b is applied to the gate of switch $S_2$. Likewise, the non-ground-referenced output (Out_1) of the driver 107c is applied to the gate of switch $S_3$, and the ground-referenced output (Out_2) of the driver 107c is applied to the gate of switch $S_4$. As previously explained above, each of the ground inputs of controller 105, including A_GND, D_GND, and P_GND are connected to provide a common ground plane, per standard grounding principles. Further example details of controller 105 will be explained in turn.

Figure 4A:
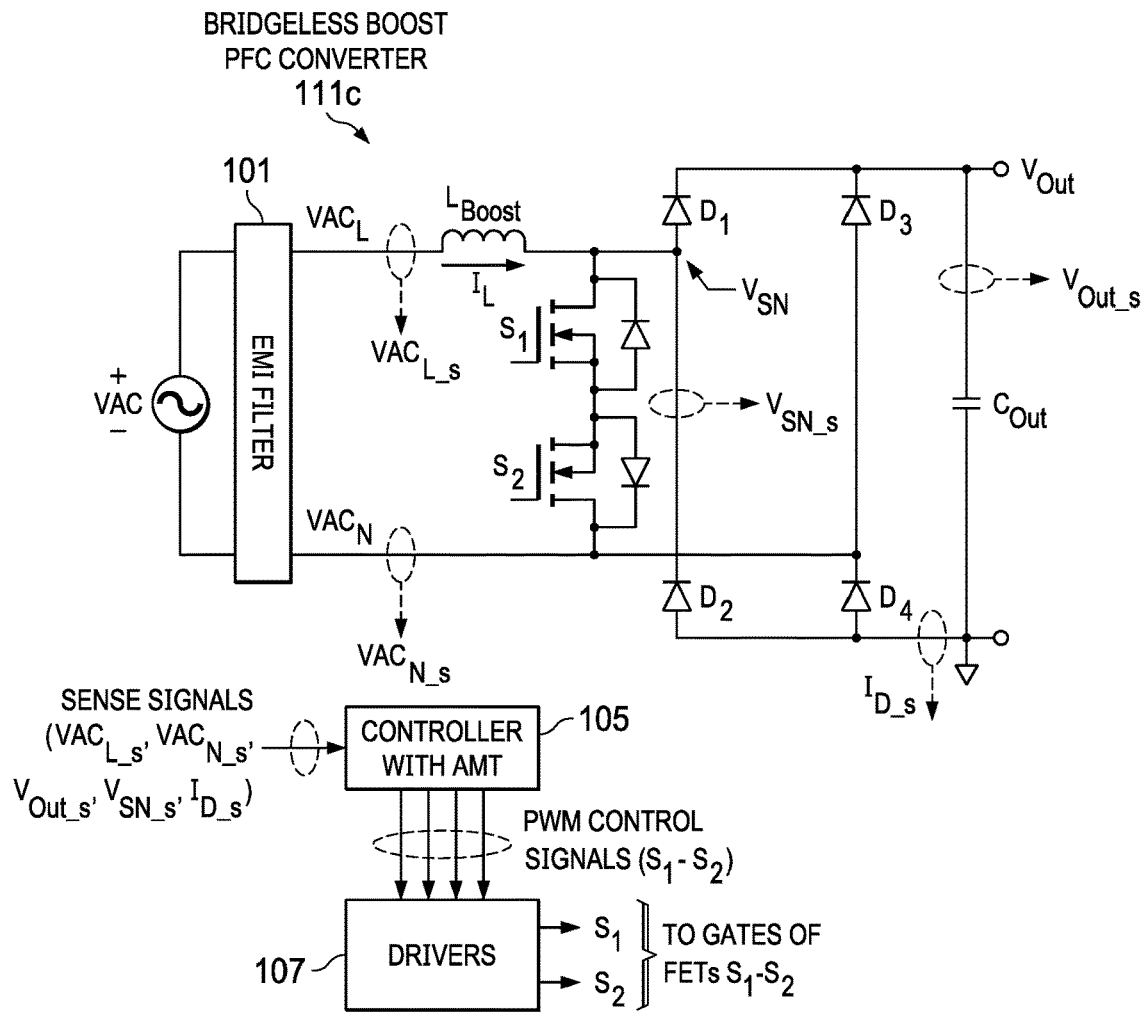
FIG. 4a schematically illustrates an example AC-DC power converter having an AC-switch bridgeless boost PFC topology, in accordance with an embodiment of the present disclosure.

FIG. 4a schematically illustrates details of an example bridgeless boost PFC topology, in accordance with an embodiment of the present disclosure. As can be seen, this example embodiment includes an AC-switch bridgeless boost PFC converter 111c, which includes a boost inductor $L_{Boost}$, switches $S_1$-$S_2$, diodes $D_1$-$D_4$, and output capacitor $C_{Out}$. The previous relevant bridgeless boost PFC topology discussion with respect to EMI filter 101, controller 105, and drivers 107 is equally applicable here.

An AC bridgeless boost converter includes two high-frequency switches ($S_1$ and $S_2$), and four high-frequency diodes ($D_1$-$D_4$). Inductor $L_{Boost}$ and $S_1$, $S_2$, $D_1$ and $D_4$ together form the boost stage for the positive line cycle, while inductor $L_{Boost}$ and $S_1$, $S_2$, $D_2$ and $D_3$ together form the boost stage for the negative line cycle. In addition, output capacitor $C_{Out}$ acts as an energy storage for both boost stages, which in conjunction with closed loop PFC control provided by controller 105, provides regulated DC voltage output $V_{Out}$ to the load. Each of these components can be implemented with standard components. In one example case, the switches $S_1$ and $S_2$ are implemented with a silicon or wide bandgap material (e.g., GaN, SiC, etc.) power MOSFETs (e.g., 650 V, 50 me), and diodes $D_1$-$D_4$ are implemented with ultra-fast recovery silicon diodes silicon diodes or wide bandgap Schottky diodes. In a more general sense, any suitable power switching and rectifier devices can be used to implement the switches $S_1$-$S_2$ and diodes $D_1$-$D_4$. To this end, the present disclosure is not intended to be limited to any particular switching and rectifier devices, or to any semiconductor materials or processes.

Figure 4B:
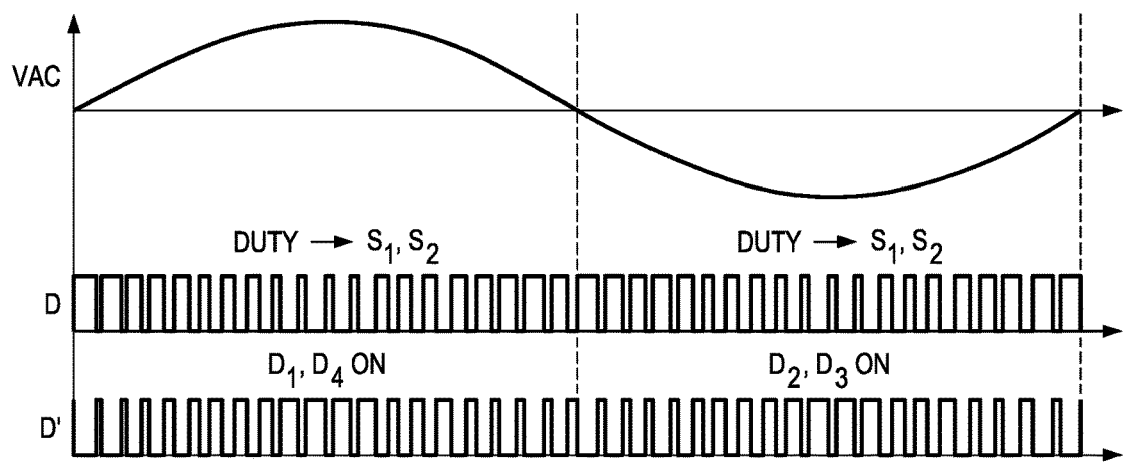
FIG. 4b illustrates operational details of the example AC-DC power converter of FIG. 4a, in accordance with an embodiment of the present disclosure.

The basic operation of the converter 111c is shown in FIG. 4b, according to an embodiment. Note that input VAC includes a positive half cycle and a negative half cycle, and the main four quadrant switch ($S_1$ and $S_2$) operates with duty cycle D throughout the line cycle. In particular, during the positive line cycle, diodes $D_1$ and $D_4$ switch complementarily to $S_1$ and $S_2$. During the negative line half cycle, diodes $D_2$ and $D_3$ switch complementarily to $S_1$ and $S_2$. In the positive line half cycle, the duty cycle D refers to the time switches $S_1$ and $S_2$ are conducting, and duty cycle D' refers to the time diodes $D_1$ and $D_4$ are conducting. Similarly, in the negative line half cycle, the duty cycle D refers to the time switches $S_1$ and $S_2$ are conducting, and duty cycle D' refers to the time diodes $D_2$ and $D_3$ are conducting. As will be explained in turn, controller 105 determines D and D' based on sensed signals $VAC_{L\_s}$, $VAC_{N\_s}$, $V_{SN\_s}$, $V_{Out\_s}$, and $I_{D\_s}$, which can be sensed using any suitable sensing circuit.

As previously explained above, the sensing circuitry can be implemented with passive or active circuitry, and that relevant discussion is equally applicable here. In still other example embodiments, each of the sensing circuits are implemented with ground-referenced resistive sensing circuits, as will be further discussed with reference to the example embodiment of FIG. 4c.

Figure 4C:
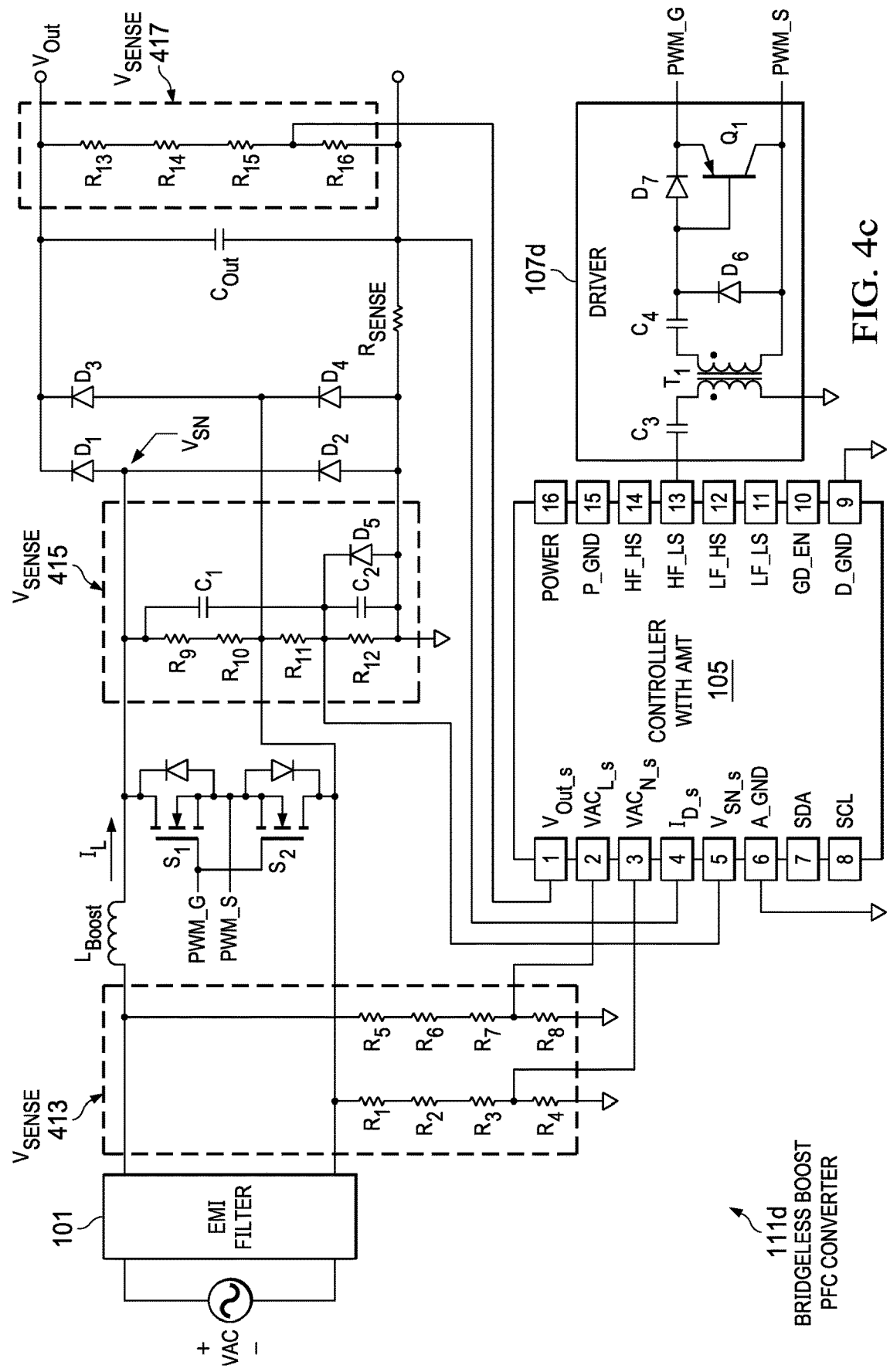
FIG. 4c schematically illustrates another example AC-DC power converter having an AC-switch bridgeless boost PFC topology, in accordance with an embodiment of the present disclosure.

FIG. 4c schematically illustrates another example AC-DC power converter having an AC bridgeless boost PFC topology, in accordance with an embodiment of the present disclosure. The previous relevant bridgeless boost PFC discussion with respect to each of EMI filter 101, controller 105, drivers 107, and bridgeless boost PFC converters 111 and 111a-c is equally applicable here, except for some differences that will be explained in turn. As can be seen in this example embodiment, controller 105 is shown with the same example pinout as previously discussed above, and that relevant discussion is equally applicable here. In addition, driver 107d in this example case is implemented with an example isolated driver circuit, such that the switches $S_1$ and $S_2$ are driven by signals PWM_G (applied to gates of $S_1$ and $S_2$) and PWM_S (applied to sources of $S_1$ and $S_2$). The signals PWM_G and PWM_S are derived from the high-frequency low-side output of the controller 105. The driver 107d of this example embodiment includes transformer $T_1$, bipolar junction transistor (BJT) $Q_1$, capacitors $C_3$ and $C_4$, and diodes $D_6$ and $D_7$, arranged as shown, but any suitable driver circuit configured to provide an isolated gate driver with isolated power supply can be used.

As can be further seen, bridgeless boost PFC converter 111d includes some ground-referenced resistive voltage divider sense circuits, including $V_{Sense}$ 413 for sensing $VAC_L$ and $VAC_N$, $V_{Sense}$ 415 for sensing $V_{SN}$, and $V_{Sense}$ 417 for sensing $V_{Out}$. In some such embodiments, each of $V_{Sense}$ 413, $V_{Sense}$ 415, $V_{Sense}$ 417, and $R_{Sense}$ can be implemented in a similar fashion as discussed with reference to FIG. 3c with respect to $V_{Sense}$ 313, $V_{Sense}$ 317, and $R_{Sense}$, respectively, and that previous relevant discussion is equally applicable here. In another embodiment, and as further shown in FIG. 4c, $V_{Sense}$ 415 is modified to reduce delay of the resistor divider. As can be seen, $V_{Sense}$ 415 still includes resistors $R_9$-$R_{12}$. In addition, capacitive divider including $C_1$ and $C_2$ is added in parallel to the resistor divider, and a schottky diode $D_5$ is connected to limit the negative voltage at the $V_{SN}$ sense node. Example values for $C_1$ and $C_2$ are 2 pF and 250 pF, respectively. Note that capacitor $C_2$ also absorbs parasitic capacitance presented by the controller 105 (e.g., comparators and any clamps). In some such embodiments, the resistor divider ratio of $V_{Sense}$ 415 is the same as the resistor divider ratio of $V_{Sense}$ 417 (much in the same way $V_{Sense}$ 313 and $V_{Sense}$ 317 can have the same resistor divider ratio, and that relevant discussion is equally applicable here). Note that such a $V_{Sense}$ 415 configuration can be used in place of $V_{Sense}$ 215 and $V_{Sense}$ 315, in accordance with some embodiments, and this discussion equally applies to such other embodiments.

As previously explained above, controller 105 has a number of gate driver outputs which provide PWM control signals, including a low-frequency low-side (LF_LS) output, a low-frequency high-side (LF_HS) output, a high-frequency low-side (HF_LS) output, a high-frequency high-side (LF_HS) output. In this example embodiment, the HF_LS output is used to generate the signals PWM_G and PWM_S, which are applied to gates of $S_1$ and $S_2$ (PWM_G) and sources of $S_1$ and $S_2$ (PWM_S), respectively.

Controller Architecture

Figure 5:
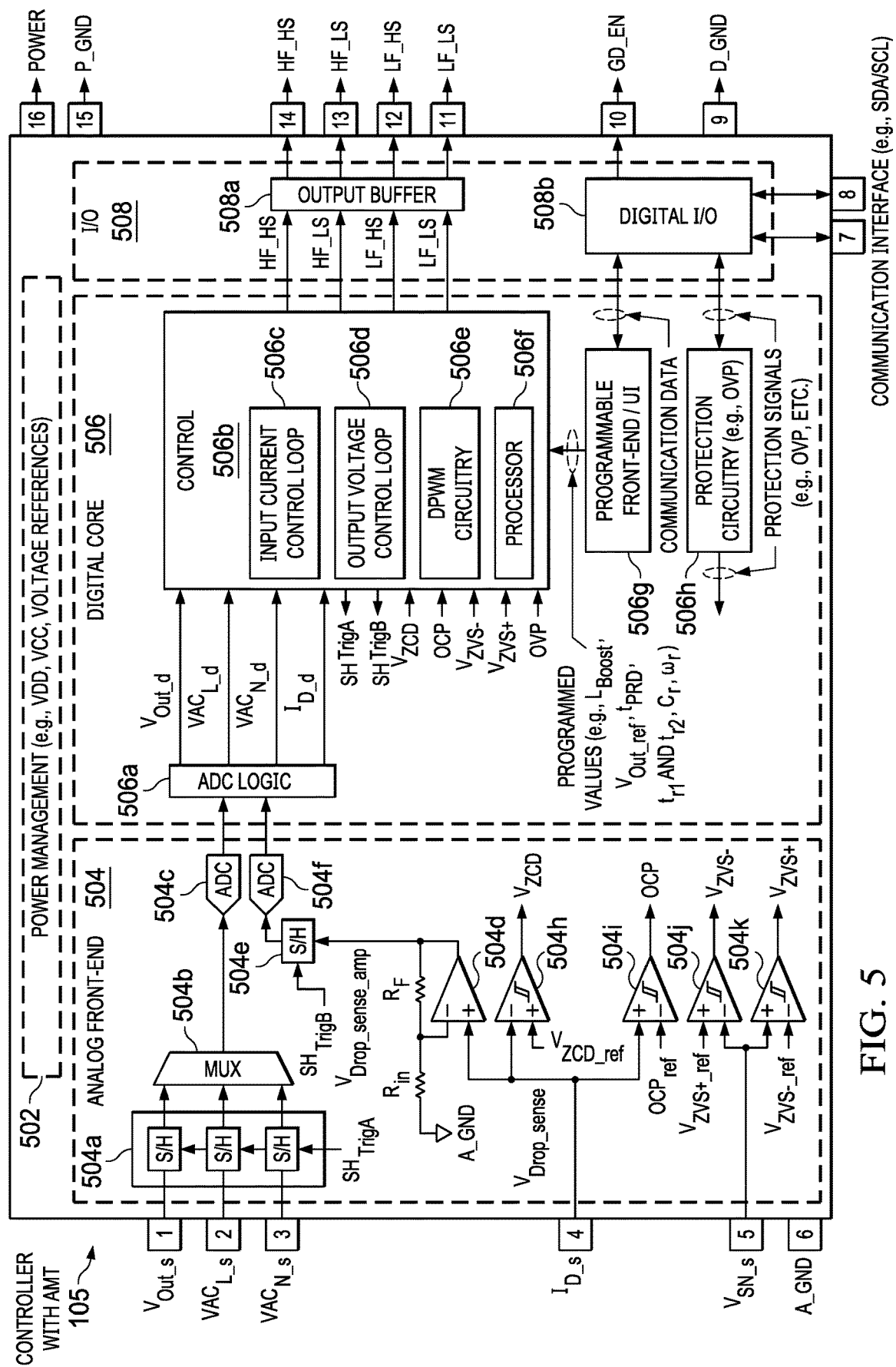
FIG. 5 schematically illustrates a controller configured with autonomous mode transition (AMT), in accordance with an embodiment of the present disclosure.

FIG. 5 schematically illustrates a controller configured with autonomous mode transition (AMT), in accordance with an embodiment of the present disclosure. Note the example pinout used in FIGS. 2c, 3c, and 4c is repeated here, to facilitate discussion of the internal circuitry of controller 105. Again, the pinout is arbitrary and not intended to limit the controller 105 to any particular pinout or packaging configuration. Other examples may be implemented with discrete components populated on a printed circuit board, rather than an integrated circuit. As can be seen, the controller 105 includes a number of functional blocks, including power management 502, analog front-end 504, digital core 506, and input/output (I/O) 508. Other embodiments may arrange such blocks in a different manner, so as to include fewer blocks or more blocks, but still allow for functionality as provided herein. Other embodiments may also include additional circuitry and functionality not depicted or discussed herein, and the present disclosure is not intended to be limited to the precise example shown. Numerous variations and configurations will be appreciated in light of this disclosure.

Power Management

The power management 502 can be implemented with standard technology and provides the various power supplies and voltage references, and any power conditioning, to support the various functions of controller 105. Example power supplies include, for instance, 3 volts to 5 volts supplies (e.g., 3.3 volts, such as for powering logic circuits), and 4 volts to 35 volts (e.g., 12 volts, such as for powering amplifiers, comparators, and ADCs). Example voltage regulating and reference circuits include, for instance, pre-regulators, low drop-out regulators, bandgap voltage reference circuits to provide a temperature insensitive voltage references, such as those used as a reference for ADCs. The power management 502 may further include one or more voltage controlled oscillators, such as one for providing a main clock by which the controller 105 can operate or otherwise synchronize operations (e.g., CLK_DPWM). The power management 502 may further include biasing circuitry and reset circuitry, or any other power or signal generation circuitry suitable for a given application. The present disclosure is noted intended to be limited to any particular configuration.

Analog Front-End

The analog front-end 504 includes various low- and high-frequency voltage and current sense circuits for processing sensed analog signals so they can be used in the control of the boost PFC converter to achieve closed loop operation. Some of the sensed signals are converted from the analog domain to the digital domain, while others are left in the analog domain. As can be seen, the sensed signals include the $V_{Out\_s}$, $VAC_{L\_s}$ and $VAC_{N\_s}$ (or $V_{Rect\_s}$ and A_GND, for bridged topologies, which would be received in place of $VAC_{L\_s}$ and $VAC_{N\_s}$), $I_{D\_s}$, and $V_{SN\_s}$. As previously explained with respect to FIGS. 1a and 4c, these sense signals can be generated by any number of active or passive sensing circuits. In some embodiments, ground-referenced resistive dividers are used to sense the input line and neutral voltages, the output voltage and the high-frequency switch node voltage, and a series resistor is used to sense the falling portion of the inductor current (diode current), such as the examples discussed with respect to FIGS. 2c, 3c, and 4c.

In more detail, and according to one example embodiment where the converter is a bridgeless boost PFC converter, external resistor dividers are used for sensing the input and output voltages. These sensed values include the AC input line and neutral voltages ($VAC_{L\_s}$ and $VAC_{N\_s}$), and the output or so-called bus voltage ($V_{Out\_s}$), which are respectively received at pins 1 through 3 of the controller 105, in this example. As previously explained above, the AC input voltages can be sensed differentially, via matched resistor dividers for line and neutral voltage sensing. For ease of control implementation, the resistor divider ratio for the AC input voltages (differential) and the output voltage $V_{Out\_s}$ can be the same, as previously explained above. Similar principles can be applied to bridged boost PFC converter topologies, except that $V_{Rect\_s}$ and A_GND used instead of $VAC_{L\_s}$ and $VAC_{N\_s}$. As can be further seen in the example analog front-end 504 of FIG. 5, all three sense pins ($VAC_{L\_s}$, $VAC_{N\_s}$, and $V_{Out\_s}$) are buffered via a sample-and-hold (S/H) circuit 504a and connected to an analog MUX 504b. The three sensed voltages are sequentially sampled through the sample-and-hold circuit 504a via MUX 504b, the output of which is then sampled by an analog-to-digital converter (ADC) 504c. The sample-and-hold circuit 504a is triggered by trigger signal $SH_{TrigA}$, which is generated in the digital core 506, as will be explained in turn. Because all of these three voltages vary relatively slowly, the ADC 504c can be designed with a relatively low conversion rate (e.g., 20 kilosamples per second, kS/s). The digital output of the ADC 504c corresponding to each of $VAC_{L\_s}$, $VAC_{N\_s}$, and $V_{Out\_s}$ is provided to the digital core 506, for use in the control of the given boost PFC converter, as will be explained in turn. In some example embodiments, the digitized sense signals generated by ADC 504c are further subjected to noise immunity processing (e.g., via ADC logic 506a, or internal to the ADC 504c), but other example embodiments may not include such noise immunity processing. In any case, the analog sense signals $VAC_{L\_s}$ and $VAC_{N\_s}$ (or $V_{Rect\_s}$), and $V_{Out\_s}$ are translated into the digital domain and are designated herein as $VAC_{L\_d}$ and $VAC_{N\_d}$ (or $V_{Rect\_d}$), and $V_{Out\_d}$, respectively.

Figure 6A:
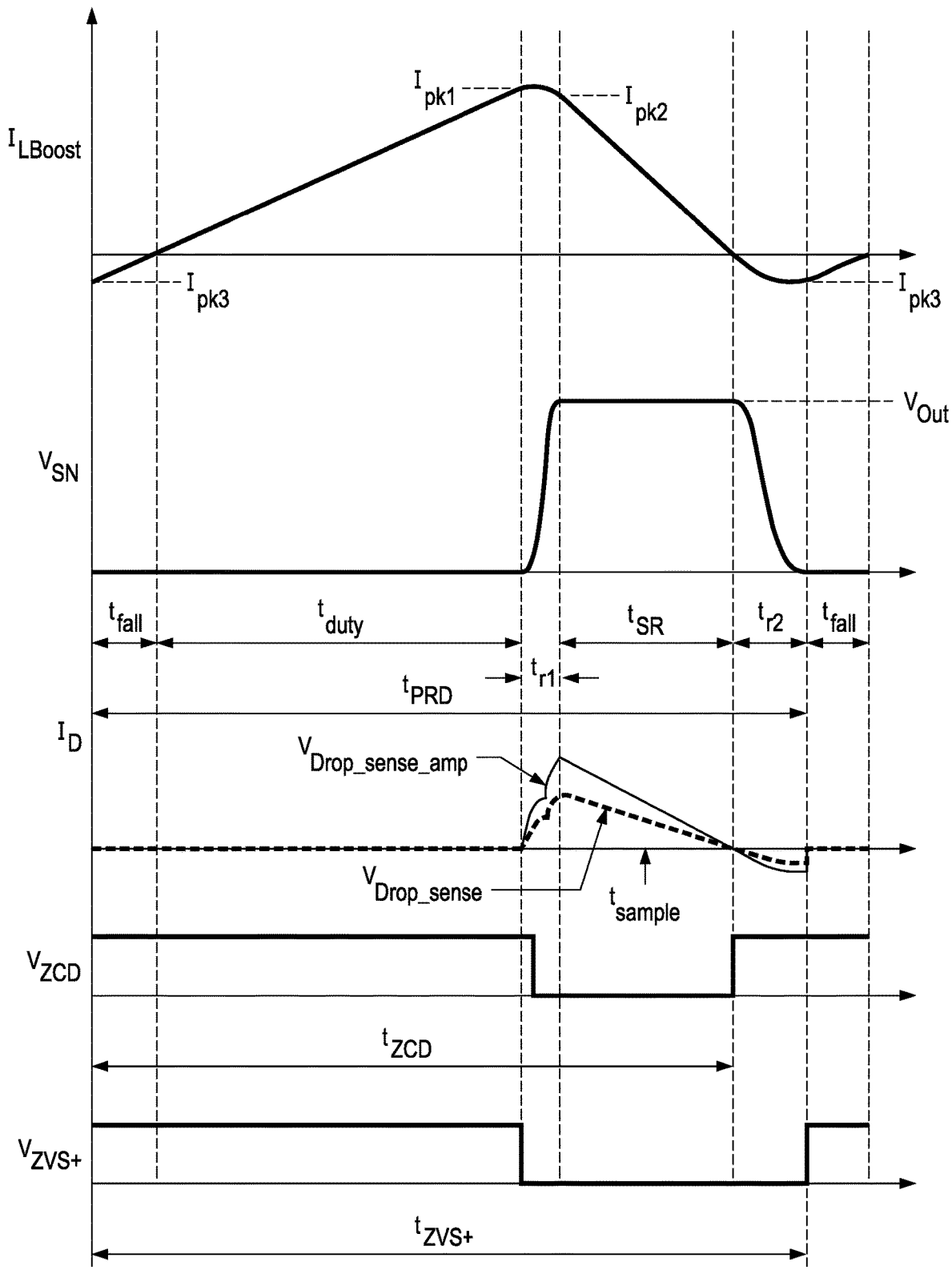
FIG. 6a illustrates example operating waveforms and sensor voltages for a totem-pole bridgeless boost operating in TM during the positive line cycle, via the controller of FIG. 5, in accordance with an embodiment of the present disclosure.

To facilitate understanding of the various sense signals and how they relate to operating waveforms of the controller 105, reference will also be made to FIG. 6a, which illustrates example operating waveforms and sensor voltages for a totem-pole bridgeless boost operating in TM during the positive line cycle, in accordance with an embodiment of the present disclosure. As can be seen, the current through the boost inductor, $I_{LBoost}$, rises from peak $I_{pk3}$ to $I_{pk1}$ and then falls from $I_{pk2}$ backdown to $I_{pk3}$, over the positive line cycle. The voltage at the high-frequency switching node, $V_{SN}$, begins its transition to high at around the peak current $I_{pk1}$ and concludes that transition around $I_{pk2}$, and then begins its transition back to low at around the positive-to-negative zero-crossing of the inductor current. The rise and fall times of the $V_{SN}$ voltage corresponds to the rise and fall times $t_{r1}$ and $t_{r2}$ (also referred to as dead-times), respectively. These dead-times may depend on various system parameters (e.g., such as $L_{Boost}$ or the parasitic capacitance at the switch node), and can be user-configurable or fixed or determined by the controller circuitry itself (e.g., such as the example case where $t_{r1}$ is user-configurable, and $t_{r2}$ results from operation of the controller circuitry itself). In addition, the synchronous rectifier current $I_D$ rises and falls during the synchronous rectifier conduction period, $t_{SR}$, as represented by $V_{Drop\_sense}$ and its amplified version $V_{Drop\_sense\_amp}$. The rising edge of the $V_{ZCD}$ voltage indicates the positive-to-negative zero-crossing of the inductor current, and the rising edge of the $V_{ZVS+}$ voltage indicates when the ZVS has been achieved during the positive line cycle. Other times depicted include: $t_{duty}$, which corresponds to the duration of the rising portion of the inductor current; $t_{fall}$, which corresponds to the duration between the occurrence of ZVS during the positive line cycle and the occurrence of the negative-to-positive zero-crossing of the inductor current; $t_{PRD}$, which corresponds to the switching frequency period (inverse of switching frequency; $t_{ZCD}$, which corresponds to the duration between the start of the switching cycle and occurrence of the positive-to-negative zero-crossing of the inductor current; and $t_{ZVS+}$, which corresponds to the duration between start of the switching cycle and the occurrence of ZVS during the positive line cycle. Similar operating waveforms and sensor voltages apply to the negative line cycle, as well as other operation modes and boost PFC topologies (e.g., single phase bridged, AC bridgeless boost) will exhibit similar operating waveforms and sensor voltages, although there are some differences. For instance, soft-switching is not available in CCM, and there is no $t_{fall}$ period during CCM operation, as inductor current does not go negative. Likewise, there is no negative line cycle processing for a bridged boost PFC topology operating in any mode.

The current sense pin ($I_{D\_s}$, pin 4) is used to sense the falling portion of the inductor current as a voltage across the sense resistor $R_{Sense}$, which corresponds to the synchronous rectifier current (sometimes referred to herein as diode current, or $I_D$) during the synchronous rectifier conduction period, $t_{SR}$. In this manner, the voltage drop across the value of $R_{Sense}$ represents the sensed current $I_D$, and is designated as $V_{Drop\_sense}$ in FIGS. 5 and 6a. Recall that the $V_{Drop\_sense}$ signal taken from across $R_{Sense}$ can be low pass filtered to remove any unwanted higher frequency signal components. This low pass filtering can be carried out external to controller 105, or internal to controller 105, using a standard low pass filter circuit (e.g., single pole low pass filter). As can be seen, the sensed voltage across $R_{Sense}$ is used for a number of purposes.

First, the sensed voltage $V_{Drop\_sense}$ is applied to a non-inverting current sense amplifier 504d, which generates an amplified version of the sensed voltage (designated as $V_{Drop\_sense}$ amp in FIGS. 5 and 6a) that is sampled via a sample-and-hold circuit 504e at the midpoint of the boost synchronous rectifier conduction period $t_{SR}$, and the sampled value is converted to the digital domain via ADC 504f. The time of this sampling point is designated as $t_{sample}$, in FIG. 6a. The resulting value (referred to herein as $I_{sample}$) is used for average current control in the digital core 506, as will be explained in turn. The sample-and-hold circuit 504e is triggered by trigger signal $SH_{TrigB}$, which is generated in the digital core 506, as will be explained in turn. In some embodiments, the non-inverting current sense amplifier 504d is designed to have a relatively high gain-bandwidth product (e.g., >300 MHz) to accurately represent the diode current, $I_D$, during the boost synchronous rectifier conduction period. The input and feedback resistors (designated as $R_F$ and $R_{in}$ in FIG. 5) can be selected to provide the desired gain, in conjunction with a broadband op-amp. In some embodiments, the amplifier 504d has a rail-to-rail output and drives the capacitive load presented by the sample-and-hold circuit 504e with relatively low overshoot. Further note that, in some embodiments, a relatively low input offset of the op-amp of amplifier 504d can be used to help more accurately represent low current levels. In addition, in effort to reduce digital delay associated with digital control, the overall digital-analog conversion time of ADC 504f can be set relatively low (e.g., less than 300 ns), according to some embodiments. In this sense, the ADC 504f is relatively fast and the ADC 504c is relatively slow. The reference voltage of the ADC 504f (referred to herein as $V_{Ref\_ADC}$) is used in computing the gain of the non-inverting current sense amplifier 504d.

Second, the sensed voltage $V_{Drop\_sense}$ is applied to a comparator 504h that determines the voltage at the positive-to-negative zero-crossing of the inductor current, this voltage being referred to herein as $V_{ZCD}$. According to an embodiment, the comparator 504h is a high speed, low input offset comparator whose output goes high when the sensed diode current $I_{D\_s}$ (as represented by the sensed voltage $V_{Drop\_sense}$) falls below a given threshold $V_{ZCD\_ref}$ (which is zero, in some embodiments). The $V_{ZCD}$ signal output by comparator 504h is used to determine the timing of the current zero-crossing and used for current control. It is also used to control the turn-off of the boost synchronous rectifier to prevent any negative current for low line voltages (e.g., $V_{ac}(t)<V_{Out}/2$) For high line conditions (e.g., $V_{ac}(t)>V_{Out}/2$), a predetermined delay is inserted between the $V_{ZCD}$ signal going high and the boost synchronous rectifier gate signal going low to build negative inductor current to achieve zero-voltage switching (ZVS) for these higher voltages. Note that both the falling and rising edges of the $V_{ZCD}$ signal can be time-stamped with respect to a counter (e.g., counter 622 of the digital core 506) to get an estimation of the boost synchronous rectifier conduction time ($t_{SR}$) and the inductor current zero crossing, according to some embodiments, and as will be explained in turn. For purposes of assessing whether the line voltage is low or high, note that $V_{ac}$ is determinable from the sensed input voltage values. For instance, for a bridgeless boost PFC topology, $V_{ac}=|VAC_{L\_s}-VAC_{N\_s}|$, and for a bridged boost PFC topology, $V_{ac}=|V_{Rect\_s}|$ or $|VAC_{L\_s}|$.

Third, the sensed voltage $V_{Drop\_sense}$ is applied to a comparator 504i which provides cycle by cycle over-current protection (OCP). In particular, if comparator 504i determines if a relatively large negative current flows through the current sense resistor $R_{Sense}$ (e.g., $I_{D\_s} \times R_{Sense}$>greater than $OCP_{ref}$), then the resulting OCP signal output by the comparator 504i can be used to shutdown switching of the boost PFC converter. This protects against, for instance, over-current events due to a shoot through or failure of the high-frequency or low-frequency half-bridges of the boost PFC converter (assuming a totem-pole bridgeless boost topology). Note the voltage reference $OCP_{ref}$ can be set or otherwise provided for a given application. In some embodiments, an over-current condition can also be sensed by comparing the peak inductor current to a given maximum allowed sense current. In more detail, the peak inductor current $I_{pk2}$ and can be estimated as:

$$I_{pk2} = \frac{V_{Out} - V_{ac}}{L_{Boost}} t_{SR}.$$

Here, the synchronous rectifier conduction time $t_{SR}$ can be estimated from the $V_{ZCD}$ signal as previously explained above, and $V_{Out}$ and $V_{ac}$ are determinable from the sensed values, and $L_{Boost}$ is given (and thus its impedance at the given line frequency is determinable, for purposes of estimating peak current $I_{pk2}$). Thus, by comparing $I_{pk2}$ to the maximum allowed current, an overcurrent event caused by an unusually high inductor current peak can be detected. So, for instance, if $I_{pk2}$ is above the given threshold, then all switching operation can be stopped. The peak current threshold can be, for example, $V_{Drop\_sense\_max}/R_{Sense}$, where $V_{Drop\_sense\_max}$ s a user-defined or otherwise given maximum allowed voltage drop across the serial resistance of $R_{Sense}$, and $R_{Sense}$ is given. Note that such OCP protection can also be provided in protection circuitry 506h, in other embodiments.

In some embodiments, due to finite settling time of the S/H circuit 504e ($t_{settle,S/H}$), for synchronous rectifier conduction times that are less than or equal to $2t_{settle,S/H}$ (high duty cycle), the ADC 504f output may contain error. If applicable, this condition can be handled in the following ways, according to some such embodiments. In CCM operation, the maximum duty cycle can be limited to always have a synchronous rectifier conduction time that is greater than $2t_{settle,S/H}$. Note that this may result in some increased THD. In TM operation, it may not be possible to limit the synchronous rectifier conduction time to greater than $2t_{settle,S/H}$. If the boost PFC converter is operating at high-frequency, this may represent a significant portion of the switching period. Even in low frequency operation, keeping the synchronous rectifier conduction time to greater than $2t_{settle,S/H}$ may result in a net negative current flowing from the output capacitor $C_{Out}$ to the input. Hence for TM operation, the current for such low synchronous rectifier conduction times can be estimated as follows. Because the synchronous rectifier conduction time $t_{SR}$ can be estimated from the $V_{ZCD}$ signal to a good accuracy, that time can be used to estimate the peak current as:

$$I_{pk2} = \frac{V_{Out} - V_{ac}}{L_{Boost}} t_{SR}.$$

A digital-to-analog converter (DAC) driven by processor 506f can be used to determine if $I_{pk2}$ for a given switching cycle was higher or lower than the provided binary DAC code. Based on the rising or falling slope of the line cycle, the DAC code is appropriately adjusted cycle-by-cycle to find closest binary DAC code (and the corresponding analog $I_{pk2}$ estimate) until the synchronous rectifier conduction time $t_{SR}$ is large enough for the S/H circuit 504e.

The high-frequency switching node voltage sense pin ($V_{SN\_s}$, pin 5) is used to sense the voltage $V_{SN}$ at the high-frequency switching node. The controller 105 uses the sensed high-frequency switch node voltage $V_{SN}$ to obtain zero-voltage switching (ZVS) information which is used during TM and PZM (hybrid mode) operation. This ZVS information is obtained using comparators 504j and 504k. In more detail, $V_{SN\_s}$ is compared to two reference voltages ($V_{ZVS+\_ref}$ and $V_{ZVS-\_ref}$) to determine the timing of ZVS for positive and negative line cycles respectively. The $V_{ZVS+}$ output of comparator 504k goes high when the high-frequency switching node voltage sense pin ($V_{SN\_s}$) falls below the $V_{ZVS+\_ref}$ voltage of comparator 504j and indicates when ZVS has been achieved during the positive line cycle. Similarly, the $V_{ZVS-}$ output of comparator 504j goes high when $V_{SN\_s}$ rises above the $V_{ZVS-\_ref}$ voltage of comparator 504k and indicates when ZVS has been achieved for the negative line cycle. As noted above, the $V_{ZVS+}$ signal is shown in FIG. 6a. The $V_{ZVS-}$ signal and the other operating signals for the negative line cycle are similar to the operating signals for the positive line cycle. In some embodiments, both the $V_{ZVS+}$ and $V_{ZVS-}$ outputs are latched to inhibit spurious transitions during fast switching events. The rising and falling edges of both of comparators 504j and 504k can both be time-stamped (in the digital core 506) to determine the location of the ZVS event with respect to the same counter used to time-stamp the rising and falling edges of $V_{ZCD}$, as will be explained in turn.

In accordance with an embodiment, note that both comparators 504j and 504k are not constrained to a low offset; further note that having a relatively small propagation delay (e.g., <50 ns) will help reduce third quadrant conduction for HF_LS and HF_HS switches implemented with GaN FETs, assuming a totem-pole bridgeless boost topology. Additionally, recall that the $V_{SN}$ sensing circuit can be modified to reduce delay of the resistor dividers, as discussed with respect to FIG. 4c. Example values for $V_{ZVS+\_ref}$ and $V_{ZVS-\_ref}$ voltages are 10% and 90% of the sensed output voltage (as determined from $V_{Out\_s}$), according to some embodiments. In such a case, the resistor divider ratio of the $V_{SN}$ sensing circuit can be the same as that of the $V_{Out}$ sensing circuit.

Each of the ground inputs of controller 105, including analog ground (A_GND, at pin 6), digital ground (D_GND, at pin 9), and power ground (P_GND, at pin 15) are connected internally within the controller, in accordance with an some embodiments. The power input at pin 16 can be any suitable power level, such as a 12 volt to 24 volt power source. Other grounding schemes and power sources can be used, and the present disclosure is not intended to be limited to any particular ones.

Digital Core

The digital core 506 of controller 105 receives in a number of inputs, some measured or sensed, some computed, and some user-provided or otherwise fixed, and generates the PWM control signal(s) to drive the switching device(s) of the boost PFC converter. As can be seen, digital core 506 includes ADC logic 506a, control block 506b, programmable front-end 506g, and protection circuitry 506h. The control block 506b includes an input current control loop 506c, an output voltage control loop 506d, digital pulse width modulation (DPWM) circuitry 506e, and processor 506f. The voltage control loop 506c and current control loop 506d will be further explained with reference to FIG. 6a, and DPWM circuitry 506e will be further explained with reference to FIG. 6b. The processor 506f can be any suitable processor or set of processors, such as a main central processing unit (CPU) and/or digital signal processor (DSP) of the controller 105.

The ADC logic 506a receives the digitized sense values from the relatively slow ADC 504c and the relatively fast ADC 504f, and provides any desired noise immunity processing (e.g., buffering, level shifting, etc.), if any. In some example embodiments, noise immunity can be integrated into the ADCs 504c and 504f. Note that not all applications will call for or otherwise use noise immunity processing. In any such cases, the digitized sense values corresponding to then sensed analog signals $VAC_{L\_s}$ and $VAC_{N\_s}$ (or $V_{Rect\_s}$), $V_{SN\_s}$, $V_{Out\_s}$, and $I_{D\_s}$, are made available to the digital core processes, and include $VAC_{L\_d}$ and $VAC_{N\_d}$, (or $V_{Rect\_d}$), $V_{SN\_d}$, $V_{Out\_d}$, and $I_{D\_d}$.

The control block 506b implements the input current control loop 506c, output voltage control loop 506d, and DPWM circuitry 506e, which will be further explained with reference to FIGS. 6a-b. As previously noted, the degree of integration of such functional modules and componentry can vary from one embodiment to the next. For instance, in some embodiments, note that the voltage control loop 506d can be implemented in the programmable front-end 506g, to name one such possible variation. Any number of such variations can be implemented, and still accomplish autonomous mode transition via a hybrid control mode (PZM), as variously described herein.

The programmable front-end 506g includes a digital interface that allows for user programming of the controller 105. Although any number of interfaces can be used and the programmed values of the controller 105 can vary from one embodiment to the next, in one example such embodiment the interface is an I2C serial interface and the programmed values include: the value of the boost inductor ($L_{Boost}$); the target voltage of the output voltage control loop ($V_{Out\_ref}$); the switching frequency period ($t_{PRD}$); minimum and maximum switching frequencies and line frequencies; dead-time tri; the resonant capacitance ($C_r$) of the boost PFC converter; the resonant frequency ($\omega_r$) of the boost PFC converter; the maximum allowed voltage drop across the serial resistance of $R_{Sense}$ ($V_{Drop\_sense\_max}$); the fixed or otherwise analog signal trigger level ($Trig_{ADC}$) for the ADC 504c; comparator thresholds and protection thresholds (e.g., $V_{ZCD\_ref}$, $V_{ZVS+\_ref}$ and $V_{ZVS-\_ref}$, $OCP_{ref}$); and mode selection (e.g., TM, CCM) if manual selection is preferred in some instances, rather than an autonomous mode. Other parameters may be configurable as well, and the present disclosure is not intended to be limited to any particular parameter set. In other embodiments, such parameter values can be hard-coded or otherwise fixed (no programming or inputting of variables). Such programmable, fixed and/or otherwise provided parameters can be used in the control of the boost PFC converter, as will be explained in turn. In some example embodiments, the programmable interface 506g may also be usable for communication to other integrated circuits or components such as a downstream DC-DC controller (e.g., LLC, via the serial interface at pins 7 and 8).

The protection circuitry 506h may include standard protection circuitry across various stresses, such as input/output over-voltage protection (OVP), input over-current protection (OCP), thermal shutdown (TSD), under voltage protection (UVP), and under voltage lockout (UVLO). Any number of such protections schemes and circuitry can be used, and the present disclosure is not intended to be limited to any particular schemes or circuitry. As can be seen, the generated protection signals can be used internal to the controller (e.g., using OCP signal as a control input), or external to the controller (e.g., by providing a protection signal to a gate driver or a downstream system via the digital I/O 508b). In some example embodiments, the gate driver enable signal (GD_EN) is derived from one or more of the protection signals (e.g., OVP) and the $V_{Out}$ signal (e.g., the gate drivers can be enabled as long as there are no failure modes indicated and the output voltage is within tolerance).

Input/Output Block

The I/O block 508 of controller 105 can be implemented with standard I/O technology. In this example embodiment, it includes an output buffer 508a and a digital I/O interface 508b. As can be seen, the output buffer 508a supplies the generated gate-output logic signals (LF_LS and LF_HS, HF_LS and HF_HS, at pins 11, 12, 13, and 14, respectively) to the low-frequency and/or high-frequency switch(es)/driver(s), depending on the boost PFC converter topology employed. The digital I/O block 508b can be used to communicate with or otherwise program the programmable front-end 506g and/or to communicate protection signals to the boost PFC converter (e.g., via GD_EN, at pin 10) or to other systems (e.g., via the communication interface at pins 7 and 8). In one example embodiment, the communication interface is implemented with an I2C serial interface including serial data and clock lines (e.g., SDA and SCL), although any number of communication interfaces can be used.

Input Current Control Loop

The controller 105 implements average current control for input current shaping and output voltage control for bus voltage regulation, according to some embodiments. As noted above, however, multimode operation and autonomous mode transition as provided herein can be accomplished with any number of current control schemes. In some example embodiments, average current control is utilized. In other examples, other current control methodologies can be used, such as peak current control, valley current control, one cycle control, or open loop current control.

Digital control is employed for both the inner current loop and the outer voltage loop. FIG. 6b schematically illustrates a voltage control loop and a current control loop of the controller of FIG. 5, in accordance with an embodiment of the present disclosure.

Figure 6B:
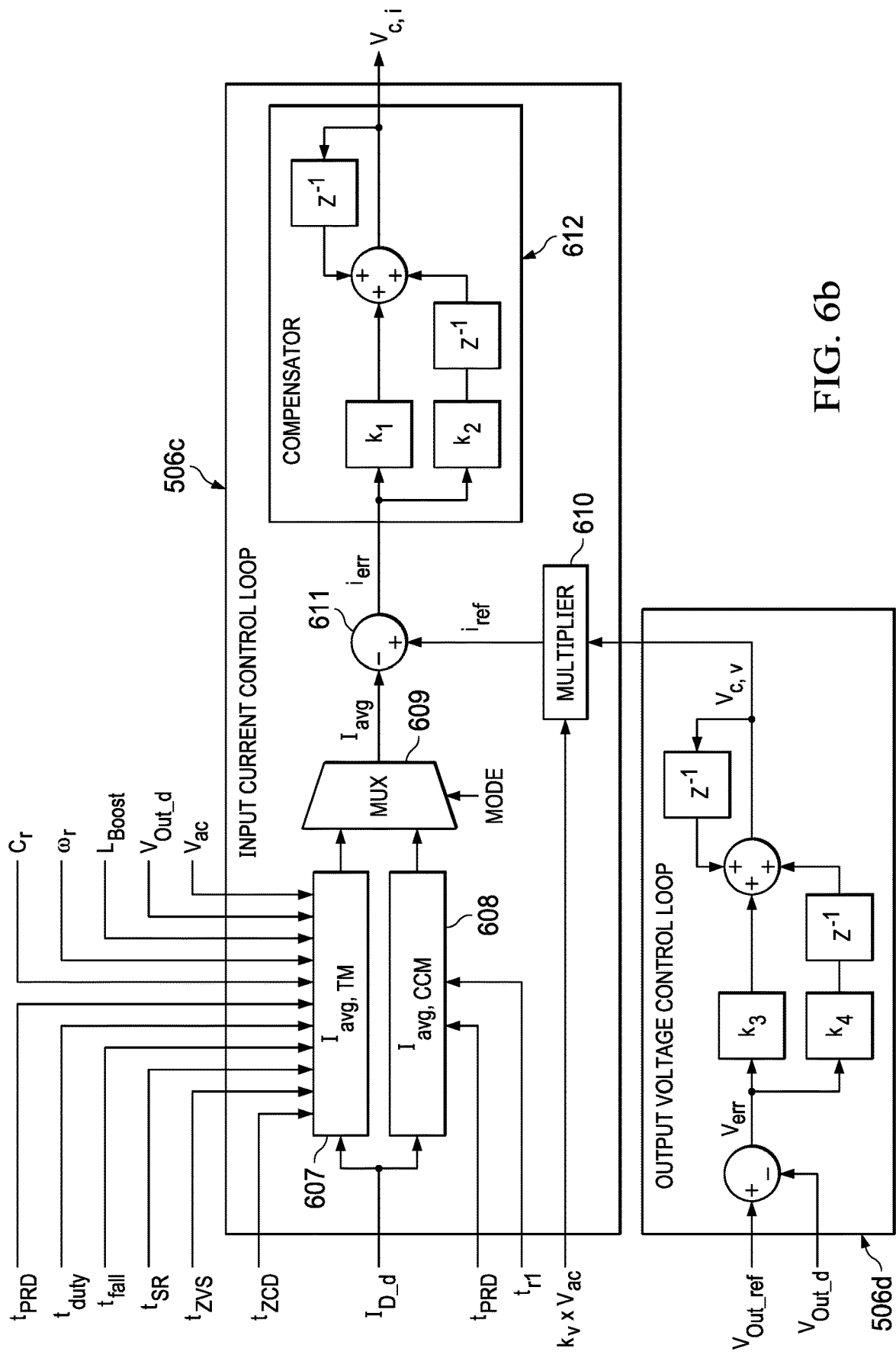
FIG. 6b schematically illustrates a voltage control loop and a current control loop of the controller of FIG. 5, in accordance with an embodiment of the present disclosure.

In more detail, and as can be seen in FIG. 6b, the input current control loop 506c includes a reference current $i_{ref}$ that is generated via multiplier 610 from the input voltage ($k_v \times V_{ac}$) and the output $V_{c,v}$ of the voltage control loop. As previously explained, $V_{ac}$ is determinable from the AC input voltages, and $k_v$ is a scaling factor. In one such embodiment, $k_v$ is equal to the resistor divider ratio of the input voltage sensors (e.g., $V_{Sense}$ 313) multiplied by the gain of ADC 504. The reference $i_{ref}$ is then compared via comparator 611 with the calculated average current, $I_{avg}$. The average current is based on the sensed current sample $I_{sample}$ (which is obtained from sense signal $I_{D\_d}$, as explained above) and further depends on the mode of operation at the time of the calculation, and is computed and scaled via either the $I_{avg,TM}$ module 607 (if the mode is TM or PZM) or $I_{avg,CCM}$ module 608 (if the mode is CCM). In some embodiments, each of modules 607 and 608 are implemented in software that when executed by processor 506f cause an average inductor current value to be computed as variously described herein. In other embodiments, each of modules 607 and 608 are implemented in gate-level logic or purpose-built semiconductor configured to compute or otherwise determine an average inductor current value as variously described herein. Multiplexor (MUX) 609 selects the appropriate module output, depending on the mode of operation. In some embodiments, the mode is determined as follows: if $t_{ZCD} \geq t_{PRD}$ then mode equals CCM (so mode equals 0, and the average current output from module 608 is selected by MUX 609); on the other hand, if $t_{ZCD} < t_{PRD}$ then mode equals TM or PZM, as the case may be, the result being the same (so mode equals 1, and the average current output from module 607 is selected by MUX 609). Note that if a signal value for the current switching cycle [k] isn't yet known, the corresponding signal value from the previous switching cycle [k−1] can be used, according to an embodiment.

For instance, according to some embodiments, for the control loop 506c computations, the current $I_D$ is sensed and sampled in the middle of the diode current cycle, $t_{SR}$, as shown in FIG. 6a. This sampled current, $I_{sample}[k]$ is then mapped to the average inductor current $I_{avg}[k]$ based on the operating mode. For CCM, the average inductor current $I_{avg}[k]$ can be approximated by the $I_{avg,CCM}$ module 608 as: $I_{sample}[k]$. This approximation assumes that the resonant transitions in CCM are insignificant and have negligible impact on the average cycle current. However, for PZM and TM (as well as DCM, with some differences noted below), this assumption is no longer true. For these modes, the average inductor current $I_{avg}[k]$ can be approximated by the $I_{avg,TM}$ module 607 as:

$$\frac{1}{t_{PRD}[k-1]} \left( \frac{t_{on}}{2} \sqrt{4 I_{sample}^2[k] + \frac{V_{Out}[k] C_r}{L_{Boost}}(V_{Out}[k] - 2V_{ac}[k])} + I_{sample}[k] t_{SR}[k-1] \right).$$

Here, $t_{on}$ is equal to $t_{duty}[k] - t_{fall}[k]$, or $t_{duty}[k] - t_{fall}[k-1]$. Note that for $k^{th}$ switching cycle, because the current is sampled and the computation is started before the switching cycle ends, the synchronous rectifier conduction time ($t_{SR}$) and the time period of the switching cycle ($t_{PRD}$) values used for computation of average current $I_{avg}$ for the $k^{th}$ switching cycle are not known. So, these two values are obtained from the previous switching cycle [k−1]. Similarly, $t_{fall}$ may rely on values from the previous switching cycle (e.g., $t_{ZVS}$), as will be discussed in turn. Signal values such as $V_{Out}$ and $V_{ac}$ may be from the current switching cycle [k] or previous switching cycle [k−1]. In any case (CCM, PZM, TM), the computed average current $I_{avg}$ provided at the output of mux 609 is compared with the reference current $i_{ref}$ and the resulting error current $i_{err}$ computed via comparator 611 is fed into a proportional integral (PI) compensator 612. The output of the PI compensator 612 is $V_{c,i}$, which is used by the DPWM circuitry 506e to generate the PWM control signal(s).

As can be seen, the PI compensator 612 is implemented in the digital domain. In more detail, for the current loop design, the duty cycle to input current transfer function of a boost PFC converter can be approximated as:

$$G_{id}(s) = \frac{V_{Out}}{s L_{Boost}}.$$

Here, $V_{Out}$ is the output voltage of the boost PFC converter (voltage across bulk capacitor $C_{Out}$, sometimes call the bus voltage) and $L_{Boost}$ is the boost PFC inductance. According to an embodiment, a PI compensator 612 of the following form is used:

$$H_{c,i}(s) = \frac{v_{c,i}(s)}{i_{err}(s)} = k_p \frac{1 + \frac{s}{\omega_z}}{s}.$$

In this example, the compensator 612 is implemented in the digital domain using Tustin's approximation given by:

$$H_{c,i}(z) = \frac{k_1 + k_2 z^{-1}}{1 + z^{-1}}.$$

Here, $k_1$ and $k_2$ can be calculated as:

$$k_1 = \frac{k_p(T_{sample}\omega_z + 2)}{2\omega_z}, \text{ and } k_2 = \frac{k_p(T_{sample}\omega_z - 2)}{2\omega_z},$$

where $T_{sample}$ is the sampling period, $k_p$ is the control loop proportional gain, and $\omega_z$ is the control loop zero. For control according to an embodiment, the current is sampled every switching cycle at $t_{sample}$ ($T_{sample} = t_{PRD}$). As the switching frequency of the converter changes in TM, the compensator parameters $k_1$ and $k_2$ are adjusted to maintain the designed cross-over frequency and phase margin. The overall loop gain of the current loop ($T_i(s)$) is given as:

$$T_i(s) = G_{id}(s) H_{c,i}(s) \frac{G_{cs}}{V_m}.$$

Here, $G_{CS}$ is the gain of the non-inverting current sense amplifier 504d, and $V_m$ is the maximum count (digital counter 622) of the DPWM circuitry 506e. $G_{CS}$ is computed as:

$$G_{cs} = R_{Sense}\left(1 + \frac{R_F}{R_{in}}\right) \frac{2^{nbits}}{V_{Ref\_ADC}},$$

where n is the number of bits of the ADC 504f, and $V_{Ref\_ADC}$ is the reference voltage of the ADC 504f. Note in other example embodiments, $k_1$ and $k_2$ can be calculated using other approximations (e.g., forward Euler, backward Euler), or other types of compensators can be used instead of a proportional integral compensator (e.g., proportional compensator, proportional integral differential compensator, proportional plus double-integral compensator).

Output Voltage Control Loop

The voltage control loop can be implemented as a standard output voltage control loop, according to some embodiments. As can be seen, the output $V_{Out}$ (as sensed and converted into the digital domain, $V_{Out\_d}$) of the boost PFC converter is compared to the reference voltage $V_{Out\_ref}$ (as programmed by user or otherwise given). The resulting error voltage is used to generate the output voltage $V_{c,v}$, which is used by the input current control loop as explained above. Any number of voltage control loops can be used and the present disclosure is not intended to be limited to any particular one.

DPWM Circuitry

Figure 6C:
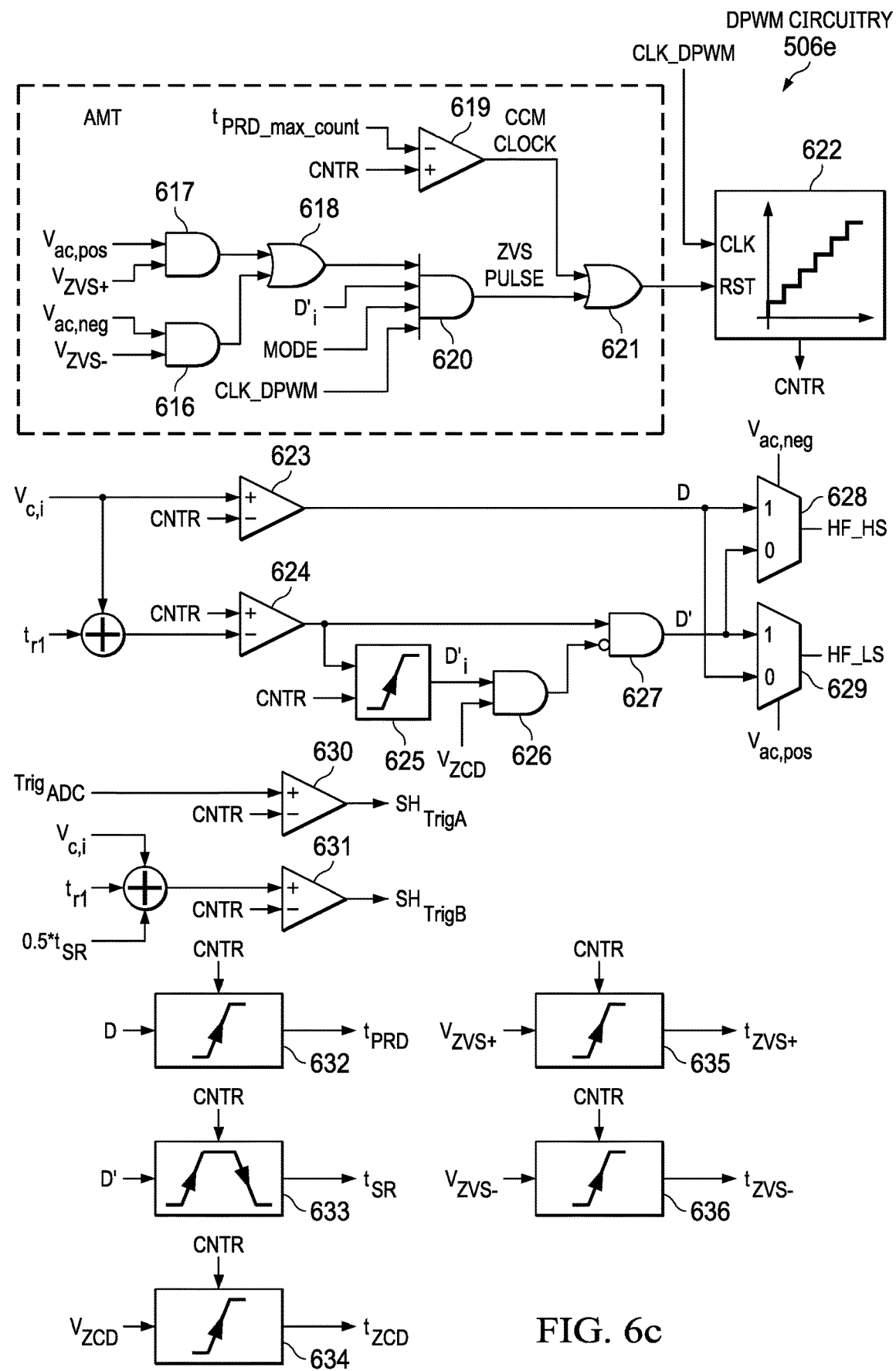
FIG. 6c schematically illustrates digital pulse width modulation (DPWM) circuitry of the controller of FIG. 5, in accordance with an embodiment of the present disclosure.

FIG. 6c schematically illustrates a DPWM circuitry 506e of the controller of FIG. 5, in accordance with an embodiment of the present disclosure. As can be seen, the DPWM circuitry 506e includes a digital counter 622 that is clocked by CLK_DPWM. This counter 622 is reset by an autonomous mode transition (AMT) block that implements the autonomous mode transition between TM, PZM and CCM. The output $V_{c,i}$ from the current compensator 612 (current control loop 506c) and programmable (or fixed) dead-time $t_{r1}$ are used to generate the gate drive signals D and D' for HF_HS and HF_LS switches. The DPWM circuitry 506e also generates the trigger signals $SH_{TrigA}$ and $SH_{TrigB}$ for the two sample-and-hold circuits 504a and 504e. The DPWM circuitry 506e also uses the generated D and D' signals to calculate $t_{PRD}$ and $t_{SR}$ signals that are used by the $I_{avg,TM}$ module 607 of the current control loop 506c. The $I_{avg,CCM}$ module 608 of the current control loop 506c also uses the $t_{PRD}$ signal. The DPWM circuitry 506e also uses the generated $V_{ZCD}$, $V_{ZVS+}$, and $V_{ZVS-}$ signals (generated by the analog front-end 504) to calculate $t_{ZCD}$, $t_{ZVS+}$, and $t_{ZVS-}$ signals, respectively, which are also used by the $I_{avg,TM}$ module 607 of the current control loop 506c.

As can be further seen, the AMT block includes a number of logic gates configured to reset the counter 622 at the end of the switching cycle by either the CCM clock signal, or by the ZVS pulse signal, whichever comes first, as detected by OR-gate 621. The CCM clock signal corresponds to the output of comparator 619. The ZVS pulse signal corresponds to the output of AND-gate 620. According to some such embodiments, this logic of the AMT block operates the boost PFC converter in CCM throughout the CCM, and hybrid mode until the desired TM frequency becomes higher than the CCM frequency, at which point the converter smoothly changes the mode to TM.

In more detail, the CCM clock signal is generated by comparator 619, which has the CNTR output of counter 622 at its positive input and the maximum counter value ($t_{PRD\_max\_count}$) at its negative input. Thus, the output of the comparator 619 provides one input of OR-gate 621 and remains low until the CNTR output of counter 622 reaches the maximum count $t_{PRD\_max\_count}$, which corresponds to the end of the switching cycle period, $t_{PRD}$. The ZVS pulse signal is derived from a number of signals, including the $V_{ZVS+}$ and $V_{ZVS-}$ signals determined by comparators 504j and 504k of the analog front-end, and $V_{ac,pos}$ and $V_{ac,neg}$ signals. The $V_{ac,pos}$ and $V_{ac,neg}$ are derived from the $VAC_{L\_s}$ and $VAC_{N\_s}$ signals. In particular, for a bridgeless topology, if $VAC_{L\_s}$ is greater than $VAC_{N\_s}$, then $V_{ac,pos}$ equals 1 and $V_{ac,neg}=0$; and if $VAC_{N\_s}$ is greater than $VAC_{L\_s}$, then $V_{ac,neg}$ equals 1 and $V_{ac,pos}$ equals 0. For a bridged topology, $V_{ac,pos}$ always equals 1 and $V_{ac,neg}$ always equals 0. Thus, in any such cases, if both $V_{ac,pos}$ and $V_{ZVS+}$ are both high, then the output of AND-gate 617 is high (thereby indicating ZVS has been achieved during the positive line cycle); on the other hand, if both $V_{ac,neg}$ and $V_{ZVS-}$ are both high, then the output of AND-gate 616 is high (thereby indicating ZVS has been achieved during the negative line cycle). OR-gate 618 senses either one of these ZVS conditions and reports same at its output.

AND-gate 620 receives the output of OR-gate 618, along with three other inputs and generates the ZVS pulse signal. In more detail, AND-gate 620 receives signal $D'_i$ which goes high on the rising edge of the duty D' signal and corresponds to the beginning of the synchronous rectifier conduction period, $t_{SR}$, or otherwise indicates that $t_{SR}$ is active. As can be seen, signal $D'_i$ is generated by rising edge detector 625, which is synchronized to the CNTR signal output by counter 622. In addition, AND-gate 620 receives the mode signal and the CLK_DPWM signal. As previously explained, the mode signal can be determined as follows: if $t_{ZCD} \geq t_{PRD}$ then mode equals CCM (so mode equals 0); on the other hand, if $t_{ZCD} < t_{PRD}$ then mode equals TM, PZM or DCM (so mode equals 1). So, the ZVS pulse signal is high in response to each of the output of OR-gate 618 (indicating ZVS for positive or negative cycle), the signal $D'_i$ (indicating duty D' signal going active and the beginning of the synchronous rectifier conduction period, $t_{SR}$), the mode signal (indicating TM is active, or PZM or DCM, as the case may be), and the CLK_DPWM signal being high.

The duty cycle signal D is generated via comparator 623, and goes high when the output $V_{c,i}$ of the current control loop 506c is higher than the CNTR value of the counter 623. The duty cycle signal D' is generated via comparator 624, rising edge detector 625, AND-gate 626 and AND-gate 627. In particular, the output of comparator 624 goes high when the sum of the given variable dead-time $t_{r1}$ and the output $V_{c,i}$ of the current control loop 506c is lower than the CNTR value of the counter 623. This output of comparator 624 is received at one of the inputs of AND-gate 627. The other input of AND-gate 627 is inverted and driven the by the output of AND-gate 626. One input of AND-gate 626 is the $V_{ZCD}$ signal and the other is D' from the rising edge detector 625. Thus, the output of AND-gate 626 is high in response to both $V_{ZCD}$ and D' being high, and is otherwise low. So, if the output of comparator 624 is high and the output of AND-gate 626 is low, the output of AND-gate 627 is high; otherwise, the output of AND-gate 627 is low. The output of AND-gate 627 corresponds to the duty cycle D' signal. As can be further seen in this example embodiment, multiplexor 628 receives the duty cycle D an D' signals at its inputs. If $V_{ac,neg}$ is high then the duty cycle D signal is selected by MUX 628; on the other hand, if $V_{ac,neg}$ is low then the duty cycle D' signal is selected by MUX 628. The output of MUX 628 provides the HF_HS control signal in this example embodiment. In addition, multiplexor 629 receives the duty cycle D an D' signals at its inputs. If $V_{ac,pos}$ is high then the duty cycle D' signal is selected by MUX 629; on the other hand, if $V_{ac,pos}$ is low then the duty cycle D signal is selected by MUX 629. The output of MUX 629 provides the HF_LS control signal in this example embodiment. Note that the D and D' duty cycle signals are not used or generated in all embodiments. For instance, an AC bridgeless boost PFC converter may use only the duty cycle signal D. In such embodiments, multiplexors 628 and 629 may not be present. On the other hand, a totem-pole bridgeless boost PFC converter can be configured as shown in FIG. 6c, according to some embodiments.

As can be further seen in FIG. 6c, comparator 630 receives the given value $\text{Trig}_{ADC}$ at its positive input and the CNTR signal at its negative input, and outputs the $\text{SH}_{TrigA}$ signal, which goes high when $\text{Trig}_{ADC}$ is greater than the CNTR signal, thereby triggering the sample-and-hold circuit 504a as previously explained. In addition, comparator 631 receives the sum of the Vc,i signal, $0.5^*t_{SR}$ signal, and the $t_{r1}$ signal at its positive input and the CNTR signal at its negative input, and outputs the $\text{SH}_{TrigB}$ signal, which goes high when the summed value at the positive input is greater than the CNTR signal, thereby triggering the sample-and-hold circuit 504e as previously explained.

As can further be seen in FIG. 6c, rising edge detector 632 receives the duty cycle D signal at its input and outputs the value of CNTR when the rising edge of the duty cycle D signal occurs. Thus, the time signal $t_{PRD}$ can be determined, which can be used in the next cycle. In addition, rising and falling edge detector 633 receives the duty cycle D' signal at its input and outputs the value of CNTR when the rising edge of the duty cycle D' signal occurs and when the falling edge of the duty cycle D' signal. Thus, the time signal $t_{SR}$ can be determined, which can be used in the next cycle. In some such embodiments, note that the edge detection may occur at the midpoint (e.g., midpoint+/−10%) of the rising edge and/or falling edge of the signal being detected, although other edge detectors may trigger anywhere along the rising or falling edge, depending on the edge detector used.

In addition, rising edge detector 634 receives the $V_{ZCD}$ signal at its input and outputs the value of CNTR when the rising edge of the $V_{ZCD}$ signal occurs. Thus, the time signal $t_{ZCD}$ can be determined, which can be used in the next switching cycle or even the current switching cycle. As can be further seen, rising edge detector 635 receives the $V_{ZVS+}$ signal at its input and outputs the value of CNTR when the rising edge of the $V_{ZVS+}$ signal occurs. Thus, the time signal $t_{ZVS+}$ can be determined, which can be used in the next switching cycle. In addition, rising edge detector 636 receives the $V_{ZVS-}$ signal at its input and outputs the value of CNTR when the rising edge of the $V_{ZVS-}$ signal occurs. Thus, the time signal $t_{ZVS-}$ can be determined, which can be used in the next switching cycle.

Operation Modes

Figure 7:
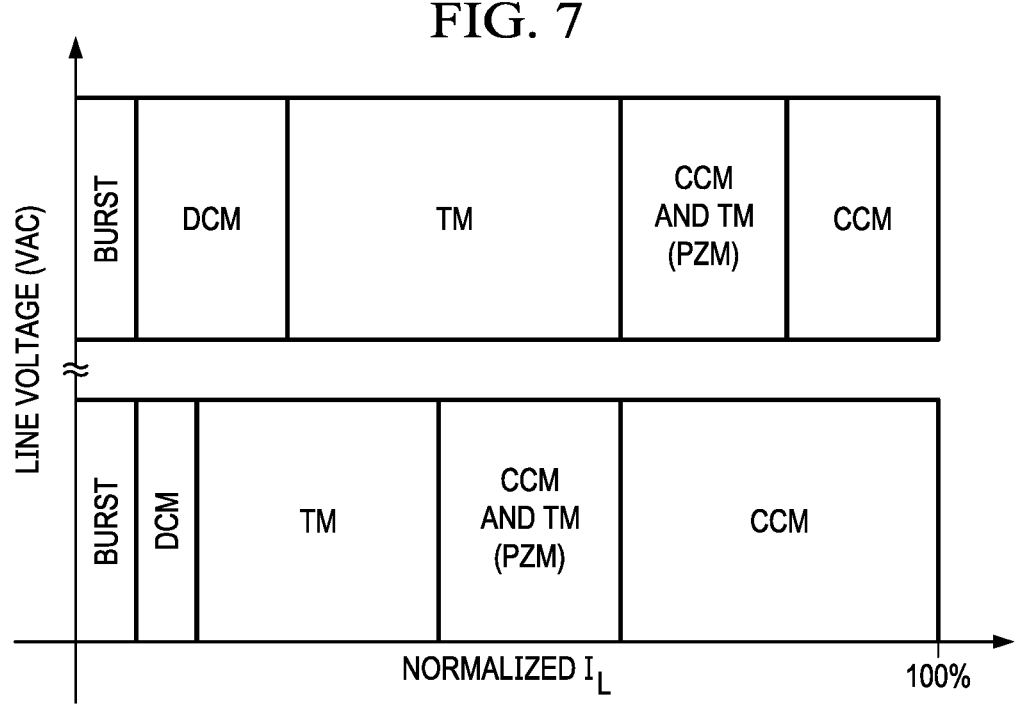
FIG. 7 graphically illustrates an autonomous mode selection methodology as a function of boost inductor current and input line voltage, in accordance with an embodiment of the present disclosure.

The controller 105 supports the converter operation in CCM, TM and DCM, as well as PZM, as explained above. The operating modes can either be user-selected (e.g., via programmable front-end 506g), or can be autonomously determined by the controller 105. FIG. 7 graphically illustrates an autonomous mode selection methodology as a function of boost inductor current and input line voltage, in accordance with an embodiment of the present disclosure. As can be seen, in autonomous mode, the boost PFC converter operates in CCM at high inductor current levels. As the current level decreases, the converter starts operating in the hybrid mode referred to herein as PZM, in which the converter operates in both CCM and TM within same line cycle with a smooth transition between CCM and TM. As the load further deceases, the operation shifts to TM operation. DCM operation is implemented to limit the operating frequency in TM at low current levels. Finally, burst mode can be implemented at very low current levels. The average current control for each operating mode will now be explained in turn, according to some example embodiments of the present disclosure.

CCM Operation

Figure 8A:
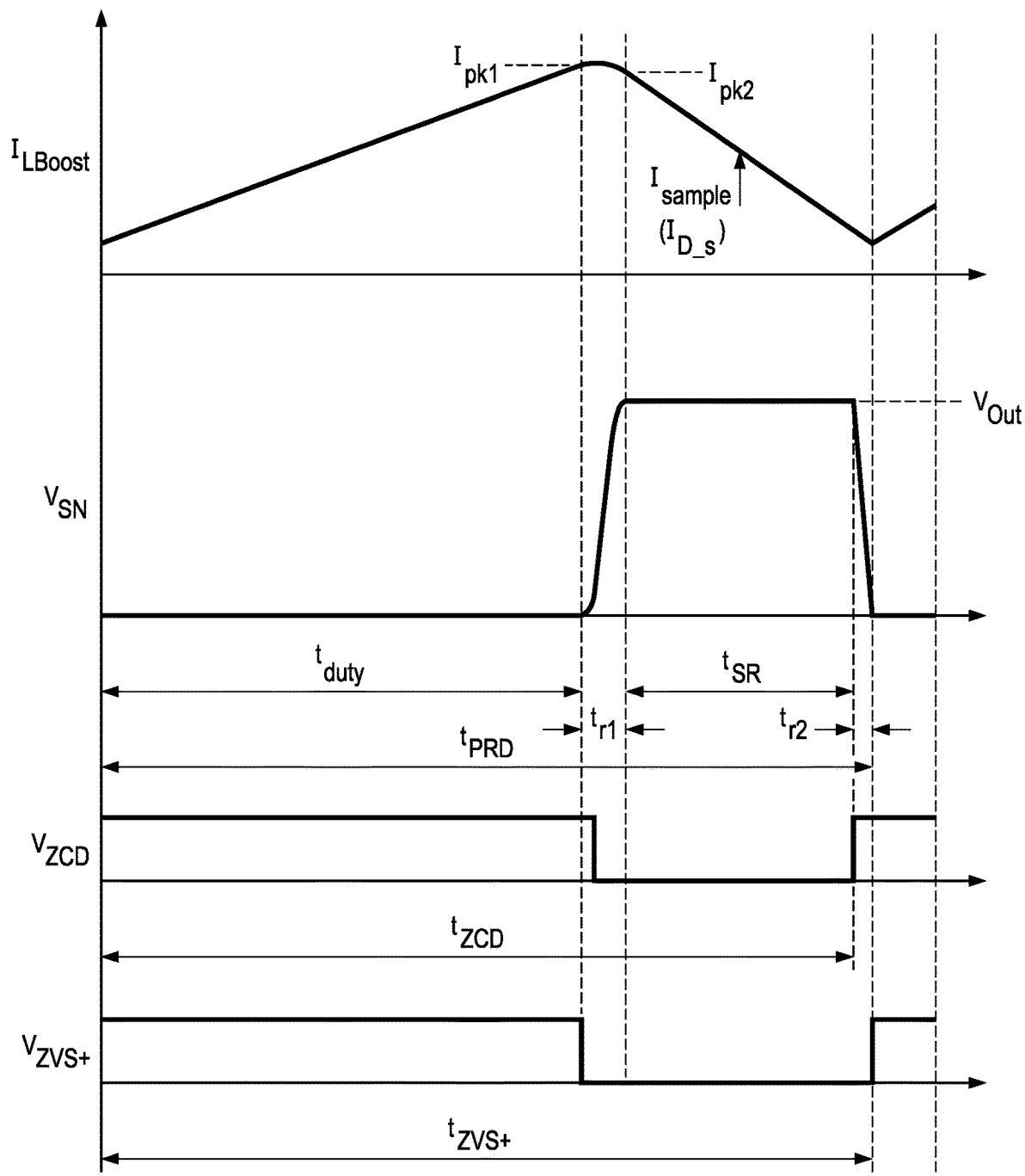
FIGS. 8a-8c and 8e each illustrates example operating waveforms for a given operation mode, for a boost PFC converter configured in accordance with an embodiment of the present disclosure.

The controller 105 supports fixed frequency CCM operation with average current control, according to some embodiments. The sensor waveforms for CCM operation are shown in FIG. 8a. Note that, for CCM, $t_{ZVS}$ equals $t_{ZCD}$, which equals $t_{PRD\_max\_count}$. According to an embodiment, the controller 105 treats the current switching cycle [k] as CCM if in the previous switching cycle [k−1], $t_{ZCD}=t_{PRD}$. In particular, the rising edge detector 634 of the converter 105 time stamps the rising edge of $V_{ZCD}$ and if that edge did not occur in the D' period of the previous switching cycle, the switching cycle is treated as a CCM cycle. In the CCM cycle, the sampling instant for $k^{th}$ switching cycle is decided as follows: $t_{sample}[k]=t_{duty}[k]+t_{r1}[k]+0.5t_{SR}[k-1]$. During CCM, the average value of input current can be calculated by the $I_{avg,CCM}$ module 608 as:

$$I_{avg,CCM} = I_{sample} \times \left(1 - \frac{t_{r1}}{t_{PRD}}\right).$$

Such a definition of $I_{avg}$ ensures a smooth transition at the boundary between CCM and PZM (partial ZVS mode, also referred to as the hybrid mode), as discussed below. As previously explained above, $I_{sample}$ results from the sample-and-hold circuit 504e capturing the inductor current at the midpoint ($t_{sample}$) of the boost synchronous rectifier conduction period, $t_{SR}$, during the current switching cycle [k], and the captured value is converted to the digital domain via ADC 504f and adjusted by ADC logic 506a (according to some embodiments), to provide $I_{sample}$ (also referred to herein as $I_{D\_d}$). Further recall that $t_{PRD}$ can be provided from the previous switching cycle [k−1], and that Li is a user-configurable or fixed or otherwise given value.

PZM Operation

Figure 8B:
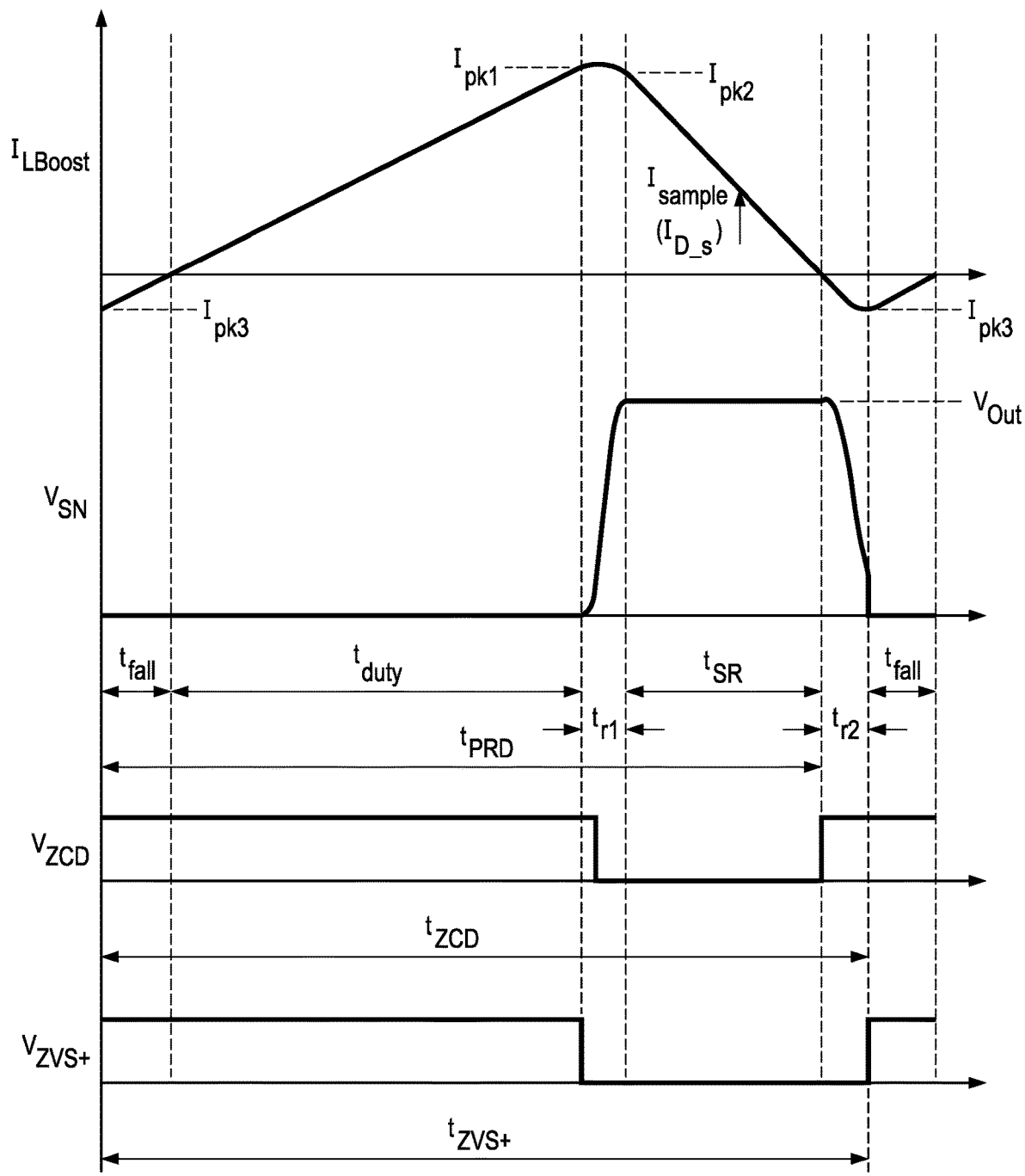

In order to have a smooth transition between CCM and TM operation, the controller 105 operates the converter in partial ZVS or hybrid mode between these two. This hybrid mode is referred to herein as PZM. PZM is a fixed frequency mode defined by the inductor current going to zero in synchronous rectifier conduction before the end of the switching period and the high-frequency switch node partially discharges during the remaining time, as shown in FIG. 8b. Note that, for PZM, $t_{ZVS}$ equals $t_{PRD}$, and $t_{ZCD}$ is less than $t_{PRD\_max\_count}$. Hence, the $V_{ZCD}$ signal goes high before the end of the period $t_{PRD}$ but the ZVS signal high at the end of period $t_{PRD}$. During PZM, the average value of input current ($I_{avg,PZM}$) can be calculated by the $I_{avg,TM}$ module 607 as:

$$I_{avg,PZM} = \frac{1}{t_{PRD}}\left(\frac{1}{2}(t_{duty} - t_{fall})\sqrt{(2I_{sample})^2 + \frac{V_{Out}C_r}{L_{Boost}}(V_{out} - 2v_{ac})} + \frac{1}{2}(2I_{sample}t_{SR})\right).$$

Here, $$t_{fall} = \frac{L_{Boost}}{v_{ac}}I_{pk3} = \frac{1}{\omega_r}(M-1)\sin(\omega_r(t_{ZVS} - t_{ZCD})),$$

$$\text{wherein } I_{pk3} = \frac{v_{ac}}{z_o}(M-1)\sin(\omega_r t_{ZVS}).$$

Note that this calculation is an approximation and assumes no contribution from $I_{pk3}$ in the average current. $I_{sample}$ is provided in a similar manner as explained with respect to CCM. In addition, $L_{Boost}$ is given, $C_r$ is the effective resonant capacitance at the high-frequency switch node (time related), $$M = \frac{V_{Out}}{v_{ac}}, \omega_r = \frac{1}{\sqrt{L_{boost}C_r}}, \text{ and } Z_o = \sqrt{\frac{L_{Boost}}{C_r}}.$$

In addition, $V_{Out}$ is obtained from sense signal $V_{Out\_d}$, and $V_{ac}=|VAC_{L\_s}-VAC_{N\_s}|$, and for a bridged topology, $V_{ac}=\bigstar V_{Rect\_s}|$ or $|VAC_{L\_s}|$. Both $V_{Out}$ and $V_{ac}$ can be from the current switching cycle or the previous switching cycle [k−1]. In addition, the values for $t_{PRD}$, $t_{SR}$, and $t_{ZVS}$, can be from the previous switching cycle [k−1], and the values for $t_{ZCD}$ and $t_{duty}$ can be obtained from either the current switching cycle [k] or the previous switching cycle [k−1].

TM Operation

At low current level, the controller 105 operates the boost PFC converter in TM. In TM, the converter naturally achieves full ZVS for $$v_{ac} < \frac{V_{Out}}{2}.$$

Figure 8C:
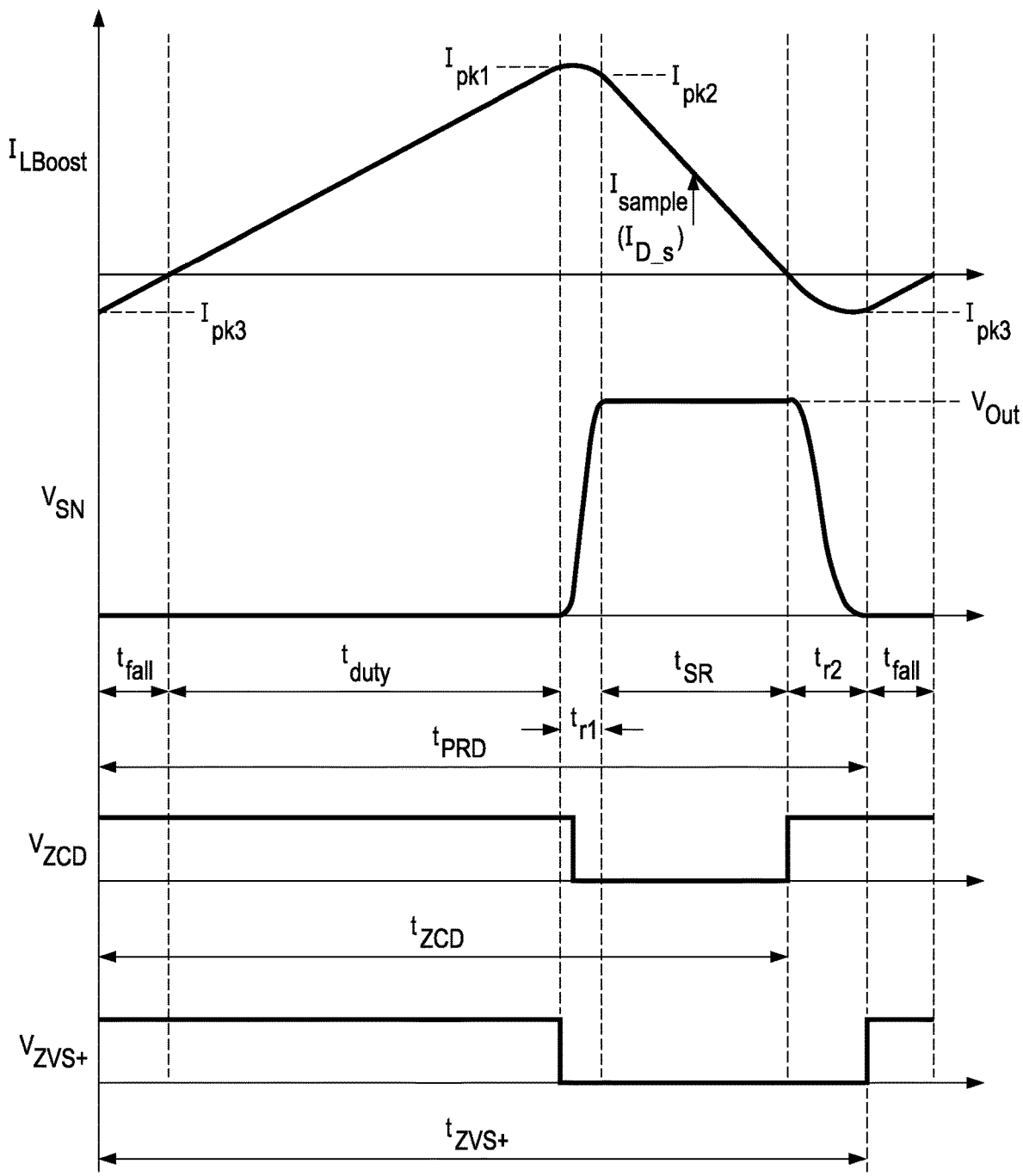

TM is characterized by both $V_{ZCD}$ and $V_{ZVS}$ sensors going high before the end of the period as shown in FIG. 8c. For TM, $t_{ZCD}$ is less than $t_{ZVS}$, and $t_{ZVS}$ is about equal to $t_{PRD}$ (e.g., $t_{ZVS}$ is the same as, or within 10% of, $t_{PRD}$), and $t_{PRD}$ is less than $t_{PRD\_max\_count}$. In TM, the average current ($I_{avg,TM}$) can be calculated by the $I_{avg,TM}$ module 607 in the same manner as done in PZM, as is shown here:

$$I_{avg,TM} = \frac{1}{t_{PRD}} \left( \frac{1}{2}(t_{duty} - t_{fall})\sqrt{(2I_{sample})^2 + \frac{V_{Out}C_r}{L_{Boost}}(V_{out} - 2v_{ac})} + \frac{1}{2}(2I_{sample}t_{SR}) \right).$$

Here, $t_{fall}$ can be calculated as follows:

$$t_{fall} = \frac{1}{\omega_r}(M-1)\sin(\omega_r(t_{ZVS} - t_{ZCD})),$$

just as with PZM operation. The previous discussion with respect to $I_{sample}$ and the various signal values that can be taken from the previous switching cycle [k−1] and/or the current switching cycle [k] is equally applicable here.

Figure 8D:
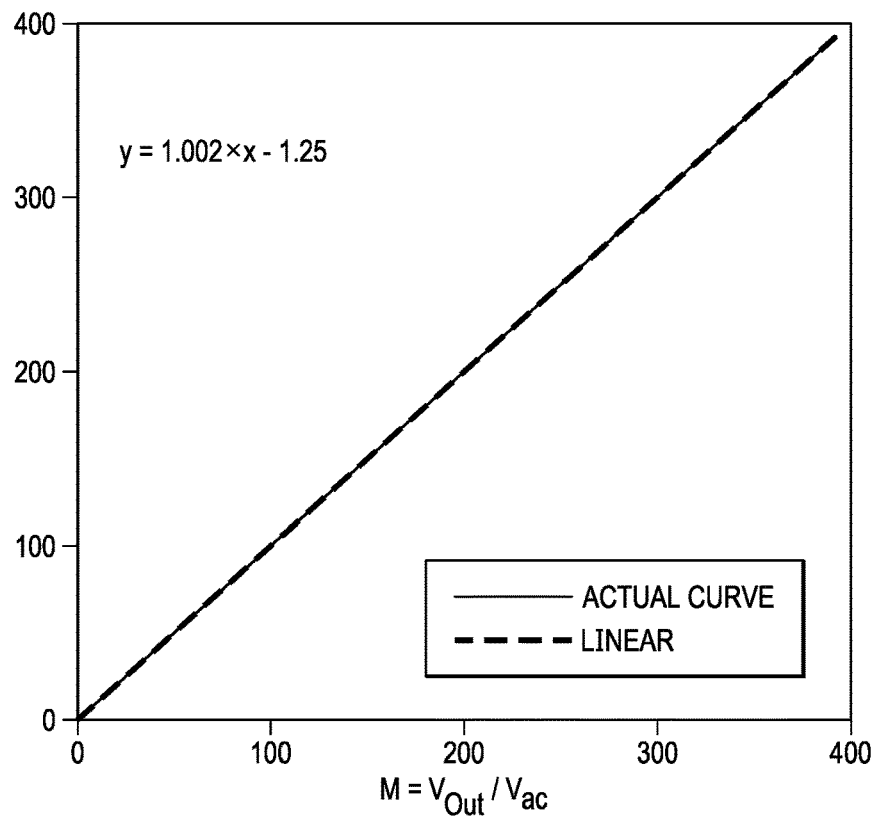
FIG. 8d graphically illustrates $t_{fall}$ estimation for transition mode (TM) operation, in accordance with an embodiment of the present disclosure.
Figure 8D:
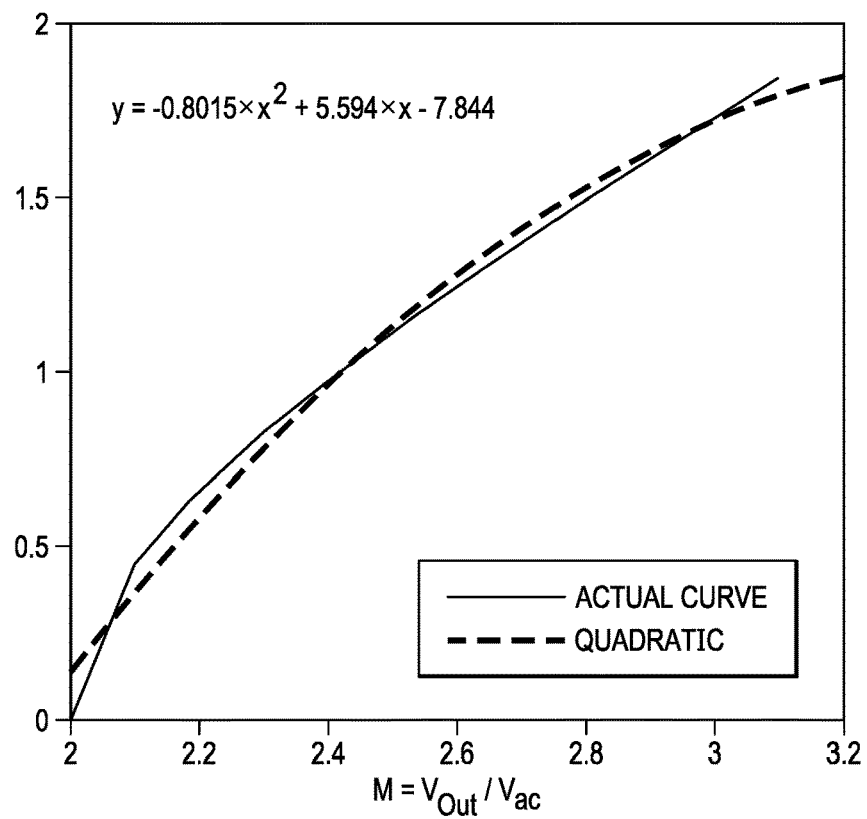

While the maximum switching frequency supported in TM can vary from one embodiment to the next, in one example case the controller 105 supports up to 1 MHz switching frequency in TM. In order to reduce computation time, $t_{fall}$ estimation can be used instead of sin(x) based approach. One such approximation is shown in FIG. 8d. The curve fitting is given for a particular value of $\omega_r$ and is only a function of $M(=V_{Out}/v_{ac})$. The coefficients of the curve fit can be scaled up or down as a function of a given boost PFC converter system's resonant parameters.

A boost PFC converter operating in TM can naturally achieve ZVS for both switch node transitions for low line conditions (e.g., $v_{ac}<V_{out}/2$). However, for high line conditions (e.g., $v_{ac}>V_{out}/2$), the high-frequency switch node may not discharge all the way to zero during dead-time period $t_{r2}$. To achieve ZVS for this high line case, the synchronous rectifier conduction time $t_{SR}$ can be extended beyond the current zero crossing by $t_{SR,extra}$ to build a negative inductor current $I_{SR,extra}$, wherein:

$$t_{SR,extra} = \frac{1}{\omega_o(M-1)}\sqrt{2M - M^2}, \text{ and } I_{SR,extra} = \frac{v_{ac}}{Z_o}\sqrt{2M - M^2}.$$

Note that $t_{SR,extra}$ can be approximated using a fourth or a fifth order polynomial for (1.1<M<2), according to some embodiments.

DCM Operation

Figure 8E:
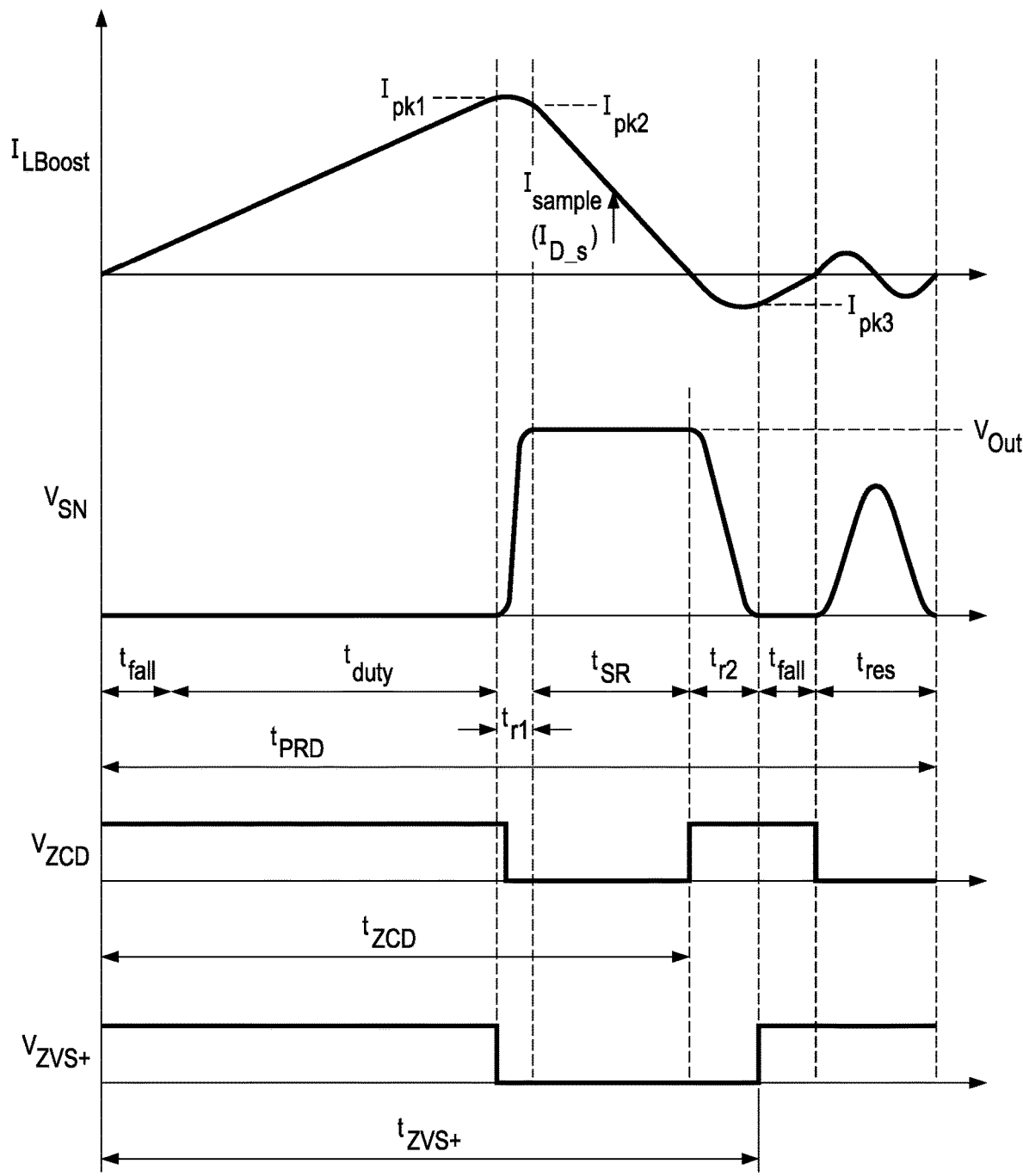

In TM, the operating frequency is inversely proportional to the average inductor current level. So at low load/high line voltage, if the desired operating frequency in TM is higher than the maximum allowed switching frequency $f_{max}$, the controller 105 changes the converter operation to DCM to limit the maximum frequency $f_{max}$, according to some embodiments. During TM operation, if the boost PFC converter tries to operate higher than $f_{max}$, the converter transitions to DCM operation at the subsequent line zero crossing and then keeps on operating in DCM. In DCM, the sensor operation and average current computation is similar to that of TM as shown in FIG. 8e, with some notable differences.

First, instead of switching in response to the ZVS signal going high, the controller 105 waits for an additional resonant interval ($t_{res}$) before starting the new cycle. Hence, the effective switching period ($t_{PRD}$) increases and the switching frequency reduces as compared to the TM operation. Second, the $t_{fall}$ estimation can be ignored. Average current in DCM can be calculated by the $I_{avg,TM}$ module 607 as:

$$I_{avg,DCM} = \frac{1}{T_{PRD}} \left( \frac{1}{2}(t_{duty})\sqrt{(2I_{sample})^2 + \frac{V_{Out}C_r}{L_{Boost}}(V_{Out} - 2V_{ac})} + \frac{1}{2}(2I_{sample}t_{SR}) \right).$$

The previous discussion with respect to $I_{sample}$ as well as the various signal values that can be taken from the previous switching cycle [k−1] and/or the current switching cycle [k] is equally applicable here. Note that $t_{fall}$ and $t_{res}$ are captured or otherwise included in $t_{PRD}$, with respect to the $I_{avg,DCM}$ calculation.

Autonomous Mode Transition

Figure 9A:
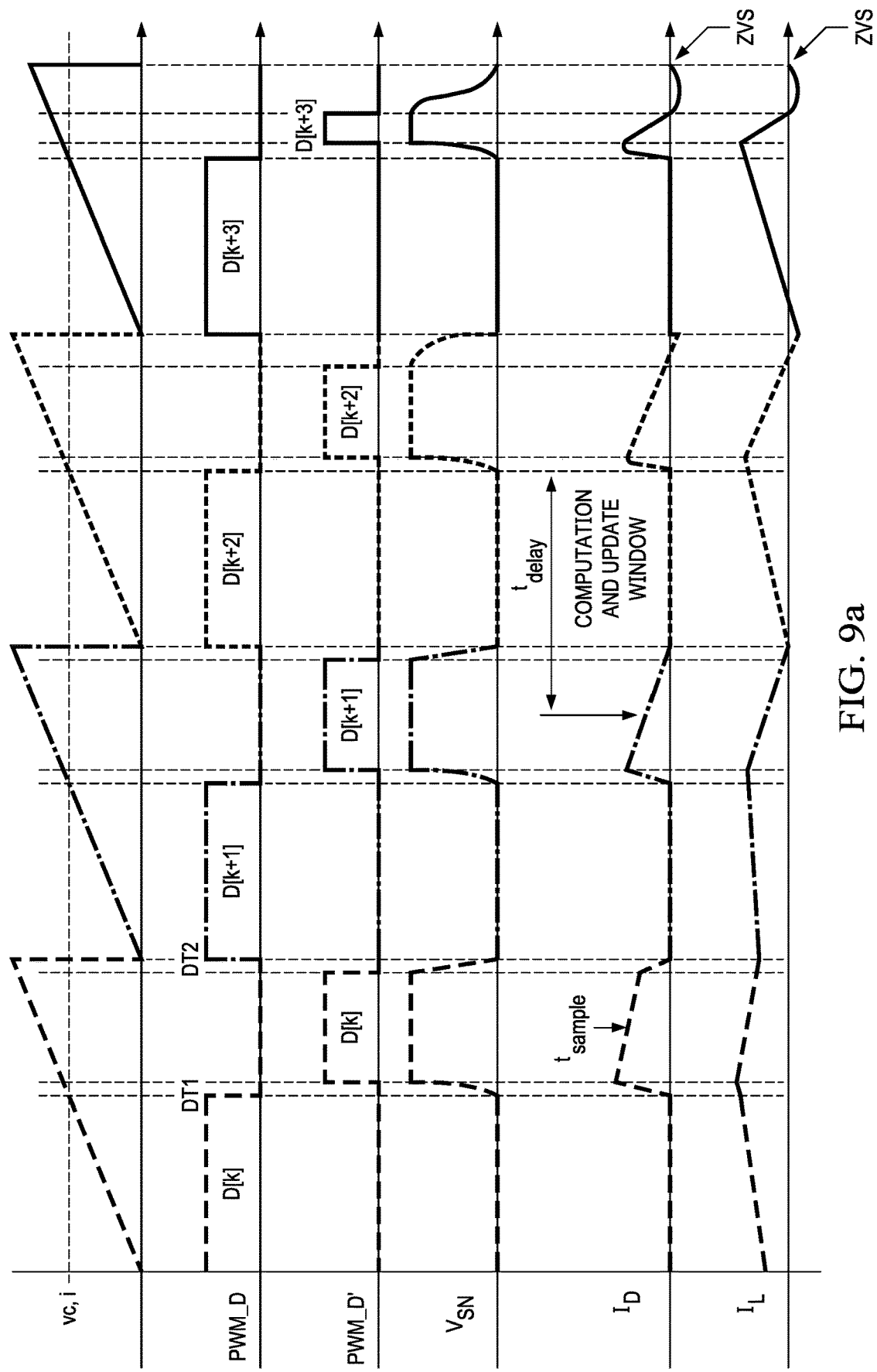
FIG. 9a illustrates multimode operation of a boost PFC converter in accordance with an embodiment of the present disclosure.

As previously noted, the controller 105 can either be configured to operate in a specific operating mode as selected by the user or it can operate in an autonomous configuration in which the controller determines the operating mode based on the inductor current level. In autonomous mode, the controller 105 implements mode determination on a cycle by cycle basis, according to an embodiment. Sensor information from the previous switching cycle is used to determine the sampling instant ($I_{sample}$ collected at $t_{sample}$, as explained above), operating mode, and associated current averaging for the present cycle, according to some examples. The following parameters can be used to determine the operating mode and mode transition boundaries: CCM operating frequency (or base frequency), $f_{CCM}$; boost inductance, $L_{Boost}$; and maximum operating frequency, $f_{max}$. According to an embodiment, the above parameters are selected such that the converter operates in CCM for peak current levels (low line, rated power) with a significant ripple in the inductor current. This situation is shown in switching cycle [k] in the example of FIG. 9a, which illustrates multimode operation of a converter in accordance with an embodiment of the present disclosure. More specifically, FIG. 9a shows cycle-by-cycle waveforms indicating the sampling instance ($t_{sample}$) and the computation and update window, generally designated as $t_{delay}$. According to an embodiment, the controller 105 computes and updates the compensator asynchronously. In some such embodiments, this effectively provides a window of time for the control loop computation and update as indicated here: $t_{delay}=0.5T_s(D+1)$, where $T_s$ corresponds to the time period of one switching cycle and D is the duty cycle of the active boost switch (the time the switch is conducting).

As can be seen in FIG. 9a, CCM operation occurs in cycle [k], CCM boundary occurs in cycle [k+1], PZM operation occurs in cycle [k+2], and TM operation occurs in cycle [k+3]. Here, $I_L$ refers to the overall boost inductor current, and $I_D$ is the equivalent diode current flowing through the sense resistor, during the synchronous rectifier conduction period $t_{SR}$. So, as noted above, the converter operates in CCM for peak current levels (low line, rated power) with a significant ripple in the inductor current in switching cycle [k] in FIG. 9a. As the current level decreases, the boundary of CCM operation is reached, when the inductor current $I_L$ falls to zero right at the end of the switching cycle [k+1], as further shown in FIG. 9a. In accordance with an embodiment t, as the current falls even further, the partial ZVS mode (PZM) operation begins, in which the converter keeps operating at $f_{CCM}$ with varying degrees of partial ZVS (cycle [k+2]). Right at the boundary of CCM, the PZM operation has complete hard switching. As the current $I_L$ falls, the amount of hard switching keeps on decreasing until the converter reaches near ZVS condition. For lower current levels, the converter operates in variable frequency TM with full ZVS (cycle [k+3]).

Figure 9B:
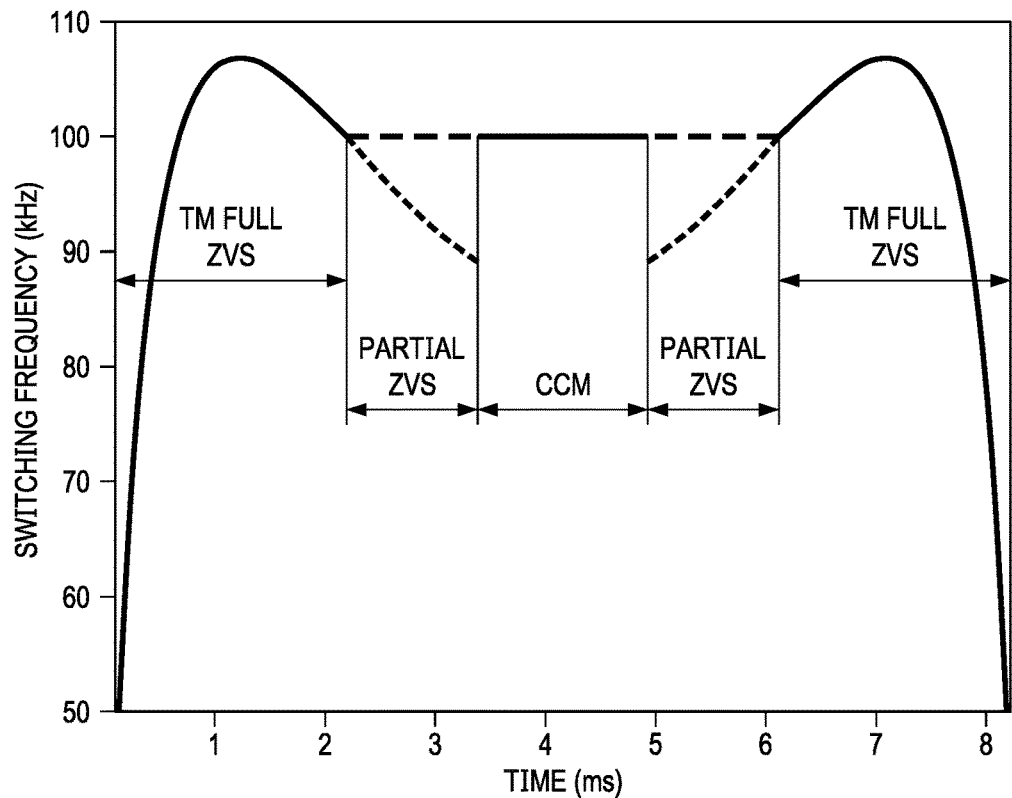
FIG. 9b illustrates multimode operation of a boost PFC converter within the same line cycle, in accordance with an embodiment of the present disclosure.

An example scenario of a boost PFC converter operating in multimode for a 60 Hz half line cycle is shown in FIG. 9b. At the peak of the line cycle, the converter operates in CCM at a fixed switching frequency ($f_{CCM}=100$ kHz). As the current decreases on either side of the peak, the converter starts operating in PZM at 100 kHz and then finally in TM. It can be seen that PZM allows for a smooth transition between CCM and TM without any jumps in operating frequency. At higher current levels, the CCM portion stretches more towards the zero-crossings. At lower current levels, the CCM portion decreases until the converter completely operates in TM for the entire line cycle.

Experimental Validation

Figure 10:
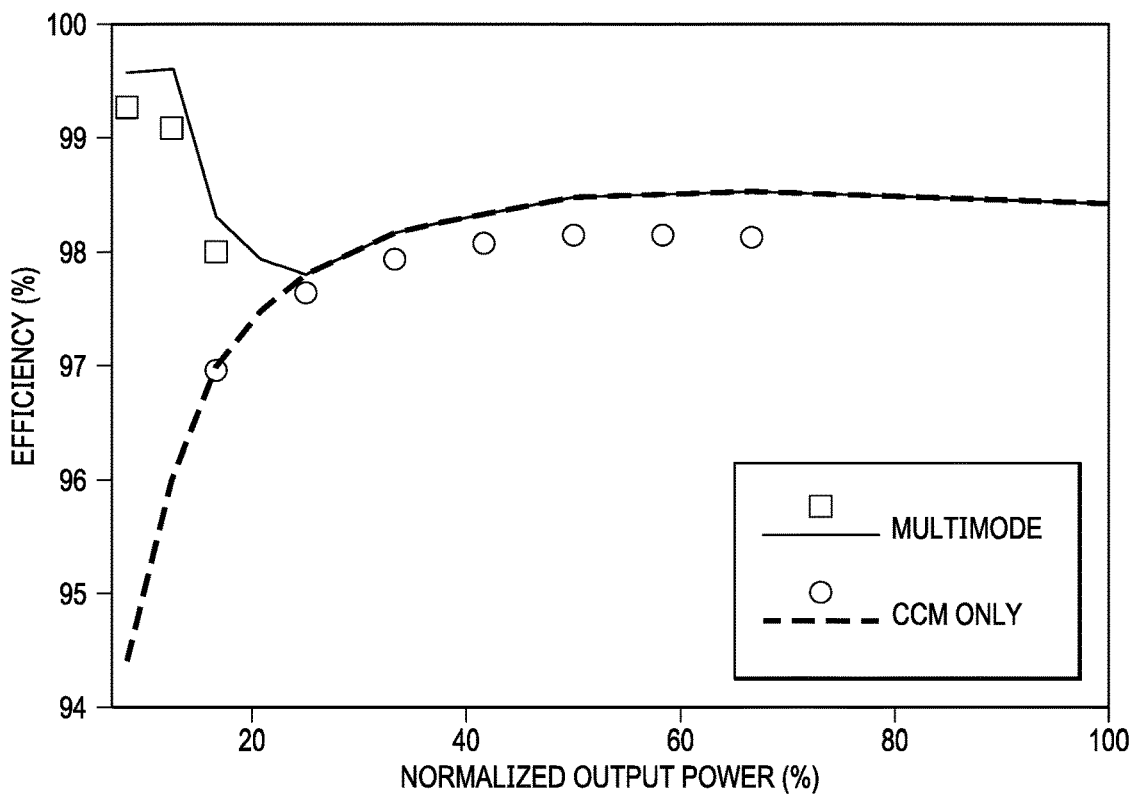
FIG. 10 graphically illustrates a comparison of experimentally measured efficiency for a standard boost PFC converter and a boost PFC converter configured in accordance with an embodiment of the present disclosure, along with the theoretically predicted efficiency curves for each converter.

To experimentally validate the efficiency advantages of a control methodology according to an embodiment of the present disclosure, a 600 W prototype totem-pole bridgeless boost PFC converter for 120 VAC line was designed, built and tested. With reference to the example totem-pole bridgeless boost PFC converter 111a of FIGS. 3a and 3c, switches $S_1$ and $S_2$ were implemented using 650 V, 50 mΩ GaN FETs, while switches $S_3$ and $S_4$ were implemented using 650 V, 30 mΩ silicon super-junction MOSFETs. In CCM, the converter was operated at a fixed switching frequency of 100 kHz. The experimentally measured efficiency for two operating conditions, namely CCM only and multimode are shown in FIG. 10 along with the theoretically predicted efficiency curves for each mode. It can be seen that the multimode operation according to an embodiment of the present disclosure achieves higher efficiency across a broader range of output power, as compared to the CCM only operation. Note how the multimode operation helps the converter achieve much better efficiency at light load. Further note that such performance can be sustained using relatively smaller inductor values. Thus, this example comparison shows that not only can better efficiency be obtained using the techniques provided herein, but also that smaller inductors values for $L_{Boost}$ can be used to achieve better efficiency with less physical space, according to some such embodiments.

FURTHER EXAMPLE EMBODIMENTS

Example 1 is a controller for a boost power factor correction (PFC) converter, the controller configured to operate the boost PFC converter in multiple operating modes, the operating modes including a continuous conduction mode (CCM), a transition mode (TM), and a hybrid mode in which the controller operates the converter in both CCM and TM within a same line cycle.

Example 2 includes the subject matter of Example 1, wherein the operating modes include a discontinuous conduction mode (DCM).

Example 3 includes the subject matter of Example 1 or 2, wherein the hybrid mode allows for autonomous transition between CCM and TM.

Example 4 includes the subject matter of any of Examples 1 through 3, wherein in the hybrid mode, the controller operates the converter at a CCM frequency until a TM frequency becomes higher than the CCM frequency, at which point the controller autonomously transitions the converter to TM operation.

Example 5 includes the subject matter of any of Examples 1 through 4, wherein the controller utilizes average current control for each of the CCM, TM, and hybrid mode.

Example 6 includes the subject matter of Example 5, wherein current used in the average current control is sensed by a passive resistive divider current sensor.

Example 7 includes the subject matter of any of Examples 1 through 6, wherein the controller is usable with both bridged and bridgeless boost PFC converter topologies.

Example 8 includes the subject matter of any of Examples 1 through 7, wherein the controller includes a current control loop configured to compute an average inductor current for each of the CCM, TM, and hybrid mode, based on a current sample taken during a boost synchronous rectifier conduction period of the boost PFC converter.

Example 9 includes the subject matter of Example 8, wherein the controller includes a mode transition circuit including digital logic circuitry and configured to generate a pulse indicating: zero-voltage switching (ZVS) has been achieved; the synchronous rectifier conduction period is active; and/or the TM or hybrid mode is active. Any combination of these conditions can be indicated by the pulse, according to some such examples.

Example 10 includes the subject matter of Example 9, wherein the controller includes a digital counter, and the pulse generated by the mode transition circuit causes the counter to reset.

Example 11 is a controller for a boost power factor correction (PFC) converter, the controller comprising: a current control loop configured to compute an average inductor current for each of a first operation mode of the boost PFC converter and a second operation mode of the boost PFC converter, based on a current sample taken during a boost synchronous rectifier conduction period of the boost PFC converter; and a mode transition circuit including digital logic circuitry and configured to generate a pulse indicating zero-voltage switching (ZVS) has been achieved.

Example 12 includes the subject matter of Example 11, wherein one of the first or second modes of operation is a hybrid mode that includes both continuous conduction mode (CCM) operation and transition mode (TM) operation within the same half line cycle.

Example 13 includes the subject matter of Example 11 or 12, wherein the first mode of operation is a continuous conduction mode (CCM), and the second mode of operation is a transition mode (TM), a discontinuous conduction mode (DCM), or a hybrid mode that includes both CCM and TM operation within the same half line cycle.

Example 14 includes the subject matter of any of Examples 11 through 13, wherein the current control loop includes: a first module configured to compute an average inductor current for the first operation mode of the boost PFC converter; a second module configured to compute an average inductor current for the second operation mode of the boost PFC converter; and a multiplexor circuit configured to select the average current computed by one of the first and second modules, based on mode of operation of the boost PFC converter.

Example 15 includes the subject matter of any of Examples 11 through 14, wherein the controller includes one or more processors, each of the first and second modules including software instructions executable by the one or more processors.

Example 16 includes the subject matter of any of Examples 11 through 15, wherein the first and second modules include gate level logic and/or semiconductor material.

Example 17 includes the subject matter of any of Examples 11 through 16, wherein one of the first or second modules is configured to compute an average inductor current according to $$\frac{1}{t_{PRD}}\left(\frac{1}{2}(t_{duty}-t_{fall})\sqrt{(2I_{sample})^2+\frac{V_{Out}C_r}{L_{Boost}}(V_{out}-2v_{ac})}+\frac{1}{2}(2I_{sample}t_{SR})\right),$$

wherein: $t_{PRD}$ corresponds to a switching frequency period of the boost PFC converter; $t_{duty}$ corresponds to a duration of a rising portion of inductor current of the boost PFC converter; $t_{fall}$ corresponds to a duration between an occurrence of ZVS and an occurrence of zero-crossing, of the boost PFC converter; $I_{sample}$ corresponds to the current sample; $V_{Out}$ corresponds to an output voltage of the boost PFC converter; $C_r$ corresponds to a resonant capacitance of the boost PFC converter; $L_{Boost}$ corresponds to a boost inductance of the boost PFC converter; $V_{ac}$ corresponds to an input voltage of the boost PFC converter; and $t_{SR}$ corresponds to the boost synchronous rectifier conduction period.

Example 18 includes the subject matter of any of Examples 11 through 16, wherein one of the first or second modules is configured to compute an average inductor current according to $$\frac{1}{t_{PRD}}\left(\frac{1}{2}(t_{duty})\sqrt{(2I_{sample})^2+\frac{V_{Out}C_r}{L_{Boost}}(V_{out}-2v_{ac})}+\frac{1}{2}(2I_{sample}t_{SR})\right),$$

wherein: $t_{PRD}$ corresponds to a switching frequency period of the boost PFC converter; $t_{duty}$ corresponds to a duration of a rising portion of inductor current of the boost PFC converter; $I_{sample}$ corresponds to the current sample; $V_{Out}$ corresponds to an output voltage of the boost PFC converter; Cr corresponds to a resonant capacitance of the boost PFC converter; $L_{Boost}$ corresponds to a boost inductance of the boost PFC converter; $V_{ac}$ corresponds to an input voltage of the boost PFC converter; and $t_{SR}$ corresponds to the boost synchronous rectifier conduction period.

Example 19 includes the subject matter of any of Examples 11 through 18, wherein the current control loop is configured to compute an average inductor current for each switching cycle, included in a group of N sequential switching cycles, of the boost PFC converter, wherein N is an integer of 2 or more.

Example 20 includes the subject matter of any of Examples 11 through 19, wherein the pulse generated by the mode transition circuit further indicates the synchronous rectifier conduction period is active.

Example 21 includes the subject matter of any of Examples 11 through 20, wherein the pulse generated by the mode transition circuit further indicates that a continuous conduction mode (CCM) is not active, and a transition mode (TM) or a hybrid mode is active, the hybrid mode including both CCM and TM operation within the same half line cycle.

Example 22 includes the subject matter of any of Examples 11 through 21, wherein the controller includes a digital counter, and the pulse generated by the mode transition circuit causes the counter to reset.

Example 23 is a system comprising a boost PFC converter and the controller of any of Examples 11 through 22.

Example 24 is a controller for a boost power factor correction (PFC) converter, the controller comprising: a current control loop configured to compute an inductor current for each of a first operation mode of the boost PFC converter and a second operation mode of the boost PFC converter, based on a current sample taken during a boost synchronous rectifier conduction period of the boost PFC converter, wherein the first mode of operation is continuous conduction mode (CCM), and the second mode of operation is a transition mode (TM), a discontinuous conduction mode (DCM), or a hybrid mode that includes both CCM and TM operation within the same half line cycle; and a mode transition circuit including digital logic circuitry and configured to generate a pulse indicating that the TM, DCM, or hybrid mode is active.

Example 25 includes the subject matter of Example 24, wherein the computed inductor current is an average inductor current, and the current control loop includes: a first module configured to compute an average inductor current for the first operation mode of the boost PFC converter; a second module configured to compute an average inductor current for the second operation mode of the boost PFC converter; and a multiplexor circuit configured to select the average current computed by one of the first and second modules, based on mode of operation of the boost PFC converter.

Example 26 includes the subject matter of Example 25, wherein the controller includes one or more processors, each of the first and second modules executable by the one or more processors. In some examples, for instance, the first and second modules include instructions encoded on a non-transitory processor-readable medium, that when executed by the one or more processor cause the average current to be computed.

Example 27 includes the subject matter of any of Examples 24 through 26, wherein the pulse generated by the mode transition circuit further indicates the synchronous rectifier conduction period is active and/or zero-voltage switching (ZVS) has been achieved.

Example 28 is a boost PFC converter system comprising: the subject matter of any of Examples 24 through 27; a boost PFC converter; and a ground-referenced series resistance for sensing the current sample taken during a boost synchronous rectifier conduction period of the boost PFC converter.

Example 29 includes a controller for a boost power factor correction (PFC) converter, the controller comprising: a current control loop configured to compute an average inductor current for each of a first operation mode of the boost PFC converter and a second operation mode of the boost PFC converter, based on a current sample taken during a boost synchronous rectifier conduction period of the boost PFC converter, wherein one of the first or second modes of operation is a hybrid mode that includes both continuous conduction mode (CCM) operation and transition mode (TM) operation within the same half line cycle; a digital counter; and a mode transition circuit including digital logic circuitry and configured to generate a pulse indicating zero-voltage switching (ZVS) has been achieved. The pulse generated by the mode transition circuit causes the counter to reset.

Example 30 includes the subject matter of Example 29, wherein the pulse generated by the mode transition circuit further indicates the synchronous rectifier conduction period is active and/or the TM or hybrid mode is active.

Example 31 is a boost PFC converter system comprising: the controller of Example 29 or 30; a boost PFC converter; a ground-referenced series resistance for sensing the current sample taken during a boost synchronous rectifier conduction period of the boost PFC converter; and a ground-referenced resistive voltage divider for sensing a switching node voltage of the boost PFC converter, wherein the sensed switching node voltage is used to generate a ZVS signal that indicates when ZVS has been achieved.

Example 32 is an integrated circuit, comprising: an analog front-end, a digital core, and an output buffer. The analog front-end has first, second, and third inputs, and first and second outputs, the first input to receive a first analog sense signal representative of an AC input voltage of a boost power factor correction (PFC) AC-to-DC converter, the second input to receive a second analog sense signal representative of a DC output voltage of the converter, the third input to receive a third analog sense signal representative of an inductor current of the converter, the first output to provide first and second digital signals, and the second output to provide a third digital signal, the first digital signal representative of the AC input voltage of the converter, the second digital signal representative of the DC output voltage of the converter, and the third digital signal representative of the inductor current of the converter. The digital core has fourth and fifth inputs, and a third output, the fourth input to receive the first and second digital signals, the fifth input to receive the third digital signal, and the third output to provide a pulse width modulation (PWM) control signal. The output buffer has a sixth input and a fourth output, the sixth input to receive the PWM control signal, and the fourth output to provide the PWM control signal for control of a switching device of the converter.

Example 33 includes the subject matter of Example 32, and in which the analog front-end has a seventh input, and fifth and sixth outputs, the seventh input to receive a fourth analog sense signal representative of a switching node voltage of the converter, the fifth output to provide a first zero-voltage switching (ZVS) signal that indicates ZVS has been achieved during a positive line cycle of the AC input voltage, and the sixth output to provide a second ZVS signal that indicates ZVS has been achieved during a negative line cycle of the AC input voltage.

Example 34 includes the subject matter of Example 32 or 33, and further includes a digital input/output (I/O) having an eight input and a seventh output, the eight input to receive a protection signal, and the seventh output to provide a driver enable signal to a driver of the converter, the driver enable signal based at least in part on a converter operation status indicated by the protection signal. The converter operation status indicated by the protection signal might be, for instance, indicative of normal (no-fault) operation, such that the driver enable signal is active and thus enables driver operation. In such a case, the driver can drive the PWM control signal to the switching device of the converter, thereby causing the switching device to switch in accordance with the PWM control signal. On the other hand, should the converter operation status indicated by the protection signal be indicative of non-normal (fault) operation, such as an over-voltage or over-current condition, the driver enable signal is not active and thus disables driver operation. In such a case, the driver prevents the PWM control signal from being applied to, and controlling, the switching device of the converter.

Example 35 includes the subject matter of any of Examples 32 through 34, and in which the digital core includes: a current control loop, a mode transition circuit, and a digital counter. The current control loop is configured to compute an average inductor current for each of a first operation mode of the boost PFC converter and a second operation mode of the boost PFC converter, based on the digital signal representative of the inductor current of the converter, one of the first or second modes of operation being a hybrid mode that includes both continuous conduction mode (CCM) operation and transition mode (TM) operation within the same half line cycle of the AC input voltage. The mode transition circuit includes digital logic circuitry and is configured to generate a pulse indicating zero-voltage switching (ZVS) has been achieve. The pulse generated by the mode transition circuit causes the counter to reset.

Example 36 is method for autonomous mode selection in a boost power factor correction (PFC) AC-to-DC converter, the converter including an inductor and having a continuous conduction mode (CCM) and a transition mode (TM). The method includes: cause the converter to operate in CCM at a first inductor current level; cause the converter to operate in a hybrid mode at a second inductor current level, the second inductor current level being lower than the first inductor current level; and cause the converter to operate in TM at a third inductor current level, the third inductor current level being lower than the second inductor current level. In the hybrid mode, the converter operates in both CCM and TM within the same cycle of an AC input signal of the converter.

Example 37 includes the subject matter of Example 36, and in which the converter includes a discontinuous conduction mode (DCM), the method including: cause the converter to operate in DCM at a fourth inductor current level, the fourth inductor current level being lower than the third inductor current level.

Example 38 includes the subject matter of Example 37, and in which the converter includes a burst mode, the method including: cause the converter to operate in burst mode at a fifth inductor current level, the fifth inductor current level being lower than the fourth inductor current level.

Example 39 includes an integrated circuit configured to carry out the method of any of Examples 36 through 38. The integrated circuit includes an analog front-end, a digital core, and an output buffer. The analog front-end has first, second, and third inputs, and first and second outputs, the first input to receive a first analog sense signal representative of an AC input signal, the second input to receive a second analog sense signal representative of a DC output voltage of the converter, the third input to receive a third analog sense signal representative of an inductor current of the converter, the first output to provide first and second digital signals, and the second output to provide a third digital signal, the first digital signal representative of the AC input voltage of the converter, the second digital signal representative of the DC output voltage of the converter, and the third digital signal representative of the inductor current of the converter. The digital core has fourth and fifth inputs, and a third output, the fourth input to receive the first and second digital signals, the fifth input to receive the third digital signal, and the third output to provide a pulse width modulation (PWM) control signal. The output buffer has a sixth input and a fourth output, the sixth input to receive the PWM control signal, and the fourth output to provide the PWM control signal for control of a switching device of the converter.

Example 40 includes the subject matter of Example 39, and in which the digital core includes a current control loop, a mode transition circuit, and digital counter. The current control loop is configured to compute an inductor current (e.g., average current) for each of a first operation mode of the boost PFC converter and a second operation mode of the boost PFC converter, based on the digital signal representative of the inductor current of the converter. One of the first or second modes of operation is a hybrid mode that includes both continuous conduction mode (CCM) operation and transition mode (TM) operation within the same half line cycle of the AC input voltage. The mode transition circuit includes digital logic circuitry and is configured to generate a pulse indicating zero-voltage switching (ZVS) has been achieve. The pulse generated by the mode transition circuit causes the counter to reset.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto

The invention claimed is:

1. A controller for a boost power factor correction (PFC) converter, the controller configured to operate the boost PFC converter in multiple operating modes, the operating modes including a continuous conduction mode (CCM), a transition mode (TM), and a hybrid mode in which the controller operates the converter in both CCM and TM within a same line cycle.

2. The controller of claim 1, wherein in the hybrid mode, the controller operates the converter at a CCM frequency until a TM frequency becomes higher than the CCM frequency, at which point the controller autonomously transitions the converter to TM operation.

3. The controller of claim 1, wherein the controller utilizes average current control for each of the CCM, TM, and hybrid mode.

4. The controller of claim 3, wherein current used in the average current control is sensed by a passive resistive divider current sensor.

5. The controller of claim 1, wherein the controller includes:
a current control loop configured to compute an average inductor current for each of the CCM, TM, and hybrid mode, based on a current sample taken during a boost synchronous rectifier conduction period of the boost PFC converter;
a mode transition circuit including digital logic circuitry and configured to generate a pulse indicating one, two or all three of zero-voltage switching (ZVS) has been achieved, the synchronous rectifier conduction period is active, and/or the TM or hybrid mode is active; and
a digital counter, wherein the pulse generated by the mode transition circuit causes the counter to reset.

6. The controller of claim 1, wherein the controller includes a mode transition circuit including digital logic circuitry and configured to generate a pulse indicating: zero-voltage switching (ZVS) has been achieved; the synchronous rectifier conduction period is active; and the TM or hybrid mode is active.

7. A controller for a boost power factor correction (PFC) converter, the controller comprising:
a current control loop configured to compute an average inductor current for each of a first operation mode of the boost PFC converter and a second operation mode of the boost PFC converter, based on a current sample taken during a boost synchronous rectifier conduction period of the boost PFC converter; and
a mode transition circuit including digital logic circuitry and configured to generate a pulse indicating zero-voltage switching (ZVS) has been achieved.

8. The controller of claim 7, wherein one of the first or second modes of operation is a hybrid mode that includes both continuous conduction mode (CCM) operation and transition mode (TM) operation within the same half line cycle.

9. The controller of claim 7, wherein the first mode of operation is a continuous conduction mode (CCM), and the second mode of operation is a transition mode (TM), a discontinuous conduction mode (DCM), or a hybrid mode that includes both CCM and TM operation within the same half line cycle.

10. The controller of claim 7, wherein the current control loop includes:
a first module configured to compute an average inductor current for the first operation mode of the boost PFC converter;
a second module configured to compute an average inductor current for the second operation mode of the boost PFC converter; and
a multiplexor circuit configured to select the average current computed by one of the first and second modules, based on mode of operation of the boost PFC converter.

11. The controller of claim 10, wherein one of the first or second modules is configured to compute an average inductor current according to $$\frac{1}{t_{PRD}}\left(\frac{1}{2}(t_{duty} - t_{fall})\sqrt{(2I_{sample})^2 + \frac{V_{Out}C_r}{L_{Boost}}(V_{out} - 2v_{ac})} + \frac{1}{2}(2I_{sample}t_{SR})\right),$$

wherein:
$t_{PRD}$ corresponds to a switching frequency period of the boost PFC converter;
$t_{duty}$ corresponds to a duration of a rising portion of inductor current of the boost PFC converter;
$t_{fall}$ corresponds to a duration between an occurrence of ZVS and an occurrence of zero-crossing, of the boost PFC converter;
$I_{sample}$ corresponds to the current sample;
$V_{Out}$ corresponds to an output voltage of the boost PFC converter;

$C_r$ corresponds to a resonant capacitance of the boost PFC converter;

$L_{Boost}$ corresponds to a boost inductance of the boost PFC converter;

$V_{ac}$ corresponds to an input voltage of the boost PFC converter; and $t_{SR}$ corresponds to the boost synchronous rectifier conduction period.

12. The controller of claim 10, wherein one of the first or second modules is configured to compute an average inductor current according to $$\frac{1}{t_{PRD}}\left(\frac{1}{2}(t_{duty})\sqrt{(2I_{sample})^2 + \frac{V_{Out}C_r}{L_{Boost}}(V_{out} - 2v_{ac})} + \frac{1}{2}(2I_{sample}t_{SR})\right),$$

wherein:

$t_{PRD}$ corresponds to a switching frequency period of the boost PFC converter;

$t_{duty}$ corresponds to a duration of a rising portion of inductor current of the boost PFC converter;

$I_{sample}$ corresponds to the current sample;

$V_{Out}$ corresponds to an output voltage of the boost PFC converter;

$C_r$ corresponds to a resonant capacitance of the boost PFC converter;

$L_{Boost}$ corresponds to a boost inductance of the boost PFC converter;

$V_{ac}$ corresponds to an input voltage of the boost PFC converter; and $t_{SR}$ corresponds to the boost synchronous rectifier conduction period.

13. The controller of claim 7, wherein the current control loop is configured to compute an average inductor current for each switching cycle, included in a group of N sequential switching cycles, of the boost PFC converter, wherein N is an integer of 2 or more.

14. The controller of claim 7, wherein the pulse generated by the mode transition circuit further indicates the synchronous rectifier conduction period is active.

15. The controller of claim 7, wherein the pulse generated by the mode transition circuit further indicates that a continuous conduction mode (CCM) is not active, and a transition mode (TM) or a hybrid mode is active, the hybrid mode including both CCM and TM operation within the same half line cycle.

16. The controller of claim 7, including a digital counter, wherein the pulse generated by the mode transition circuit causes the counter to reset.

17. A system comprising a boost PFC converter and the controller of claim 7.

18. An integrated circuit, comprising:
an analog front-end having first, second, and third inputs, and first and second outputs, the first input to receive a first analog sense signal representative of an AC input voltage of a boost power factor correction (PFC) AC-to-DC converter, the second input to receive a second analog sense signal representative of a DC output voltage of the converter, the third input to receive a third analog sense signal representative of an inductor current of the converter, the first output to provide first and second digital signals, and the second output to provide a third digital signal, the first digital signal representative of the AC input voltage of the converter, the second digital signal representative of the DC output voltage of the converter, and the third digital signal representative of the inductor current of the converter;

a digital core having fourth and fifth inputs, and a third output, the fourth input to receive the first and second digital signals, the fifth input to receive the third digital signal, and the third output to provide a pulse width modulation (PWM) control signal; and an output buffer having a sixth input and a fourth output, the sixth input to receive the PWM control signal, and the fourth output to provide the PWM control signal for control of a switching device of the converter.

19. The integrated circuit of claim 18, in which the analog front-end has a seventh input, and fifth and sixth outputs, the seventh input to receive a fourth analog sense signal representative of a switching node voltage of the converter, the fifth output to provide a first zero-voltage switching (ZVS) signal that indicates ZVS has been achieved during a positive line cycle of the AC input voltage, and the sixth output to provide a second ZVS signal that indicates ZVS has been achieved during a negative line cycle of the AC input voltage.

20. The integrated circuit of claim 18, including a digital input/output (I/O) having an eight input and a seventh output, the eight input to receive a protection signal, and the seventh output to provide a driver enable signal to a driver of the converter, the driver enable signal based at least in part on a converter operation status indicated by the protection signal.

21. The integrated circuit of claim 18, in which the digital core includes:
a current control loop configured to compute an average inductor current for each of a first operation mode of the boost PFC converter and a second operation mode of the boost PFC converter, based on the digital signal representative of the inductor current of the converter, one of the first or second modes of operation being a hybrid mode that includes both continuous conduction mode (CCM) operation and transition mode (TM) operation within the same half line cycle of the AC input voltage;

a mode transition circuit including digital logic circuitry and configured to generate a pulse indicating zero-voltage switching (ZVS) has been achieve; and a digital counter, the pulse generated by the mode transition circuit to reset the counter.

22. A method for autonomous mode selection in a boost power factor correction (PFC) AC-to-DC converter, the converter including an inductor and having a continuous conduction mode (CCM) and a transition mode (TM), the method comprising:
cause the converter to operate in CCM at a first inductor current level;
cause the converter to operate in a hybrid mode at a second inductor current level, the second inductor current level being lower than the first inductor current level, and in the hybrid mode the converter operates in both CCM and TM within the same cycle of an AC input signal of the converter; and
cause the converter to operate in TM at a third inductor current level, the third inductor current level being lower than the second inductor current level.

23. The method of claim 22, in which the converter includes a discontinuous conduction mode (DCM), the method including:

cause the converter to operate in DCM at a fourth inductor current level, the fourth inductor current level being lower than the third inductor current level.

24. The method of claim 23, in which the converter includes a burst mode, the method including:
cause the converter to operate in burst mode at a fifth inductor current level, the fifth inductor current level being lower than the fourth inductor current level.

25. An integrated circuit configured to carry out the method of claim 22, the integrated circuit including:
an analog front-end having first, second, and third inputs, and first and second outputs, the first input to receive a first analog sense signal representative of an AC input signal, the second input to receive a second analog sense signal representative of a DC output voltage of the converter, the third input to receive a third analog sense signal representative of an inductor current of the converter, the first output to provide first and second digital signals, and the second output to provide a third digital signal, the first digital signal representative of the AC input voltage of the converter, the second digital signal representative of the DC output voltage of the converter, and the third digital signal representative of the inductor current of the converter;
a digital core having fourth and fifth inputs, and a third output, the fourth input to receive the first and second digital signals, the fifth input to receive the third digital signal, and the third output to provide a pulse width modulation (PWM) control signal; and
an output buffer having a sixth input and a fourth output, the sixth input to receive the PWM control signal, and the fourth output to provide the PWM control signal for control of a switching device of the converter.

* * * * *